US 7,522,658 B2

(12) United States Patent
Jensen

(10) Patent No.: US 7,522,658 B2
(45) Date of Patent: Apr. 21, 2009

(54) DESIGN METHOD AND IMPLEMENTATION OF OPTIMAL LINEAR IIR EQUALIZERS FOR RF TRANSCEIVERS

(75) Inventor: Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 585 days.

(21) Appl. No.: 10/993,294

(22) Filed: Nov. 19, 2004

(65) Prior Publication Data

US 2005/0100105 A1    May 12, 2005

Related U.S. Application Data

(63) Continuation-in-part of application No. 10/954,911, filed on Sep. 30, 2004, now Pat. No. 7,397,863, and a continuation-in-part of application No. 10/954,883, filed on Sep. 30, 2004, now Pat. No. 7,480,344, and a continuation-in-part of application No. 10/944,552, filed on Sep. 17, 2004, and a continuation-in-part of application No. 10/944,551, filed on Sep. 17, 2004, now Pat. No. 7,372,917, and a continuation-in-part of application No. 10/925,485, filed on Aug. 25, 2004, and a continuation-in-part of application No. 10/676,221, filed on Sep. 30, 2003, now Pat. No. 7,027,780.

(51) Int. Cl.
    *H04B 1/38* (2006.01)
(52) U.S. Cl. .............. 375/219; 375/135; 375/136; 375/226; 375/279; 375/308
(58) Field of Classification Search ......... 375/135–136, 375/146–147, 219, 296–297, 303, 308, 316, 375/329, 334, 346, 350, 260, 267, 279
See application file for complete search history.

(56) References Cited

U.S. PATENT DOCUMENTS

| 6,628,923 | B1 * | 9/2003 | Eriksson | 455/63.1 |
|---|---|---|---|---|
| 6,654,431 | B1 * | 11/2003 | Barton et al. | 375/346 |
| 6,661,900 | B1 * | 12/2003 | Allred et al. | 381/103 |
| 7,054,606 | B1 * | 5/2006 | Sheng et al. | 455/306 |
| 7,159,002 | B2 * | 1/2007 | Gurrapu | 708/320 |
| 7,177,610 | B2 * | 2/2007 | Scott et al. | 455/259 |
| 2002/0114301 | A1 * | 8/2002 | Yee et al. | 370/338 |
| 2002/0154620 | A1 * | 10/2002 | Azenkot et al. | 370/347 |

(Continued)

*Primary Examiner*—Shuwang Liu
*Assistant Examiner*—Hirdepal Singh
(74) *Attorney, Agent, or Firm*—Garlick Harrison & Markison; James A. Harrison

(57) ABSTRACT

A digital filter with equalizers and a corresponding method for optimizing a linear equalizer of an RF transceiver determining filter characteristics of the specified analog filter, determining total signal filtering of the RF transceiver based upon a discrete time model of the specified analog filter and upon characteristics of the digital filter, determining an inverse of the determined total signal filtering; multiplying the inverse of the determined total signal filtering with the determined total signal filtering and optimally matching the desired equalizer filtering characteristic with an IIR magnitude equalizer to determine an optimal approximation of a magnitude response of the discrete time model of the specified analog filter. Thereafter, the method includes adding an inverse of the optimal approximation of the magnitude response and optimally matching the pre-distorting group delay response of the filter to obtain an optimal approximation to the pre-distorting group delay response of the filter.

16 Claims, 11 Drawing Sheets

U.S. PATENT DOCUMENTS

| | | | |
|---|---|---|---|
| 2002/0164949 A1* | 11/2002 | Beech et al. | 455/13.4 |
| 2003/0103444 A1* | 6/2003 | Wildhagen et al. | 370/201 |
| 2003/0193923 A1* | 10/2003 | Abdelgany et al. | 370/342 |
| 2004/0190644 A1* | 9/2004 | Nemer et al. | 375/296 |
| 2007/0021076 A1* | 1/2007 | Tanaka et al. | 455/118 |
| 2007/0288235 A1* | 12/2007 | Vaananen et al. | 704/229 |

* cited by examiner

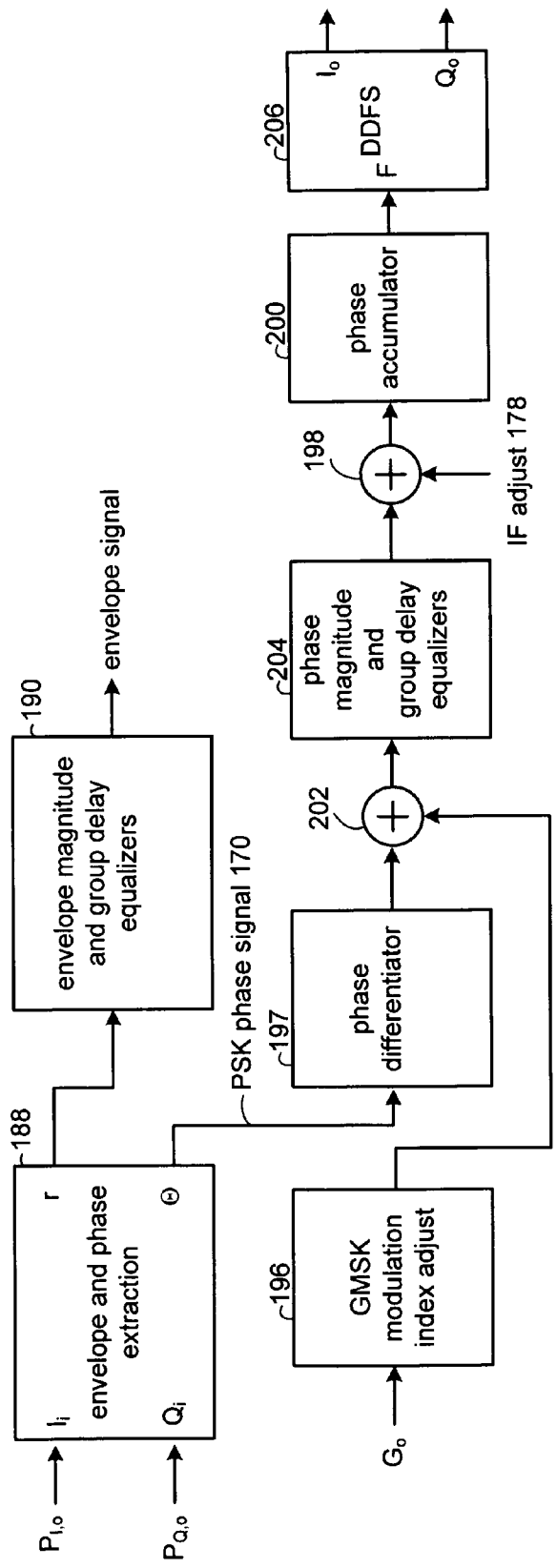
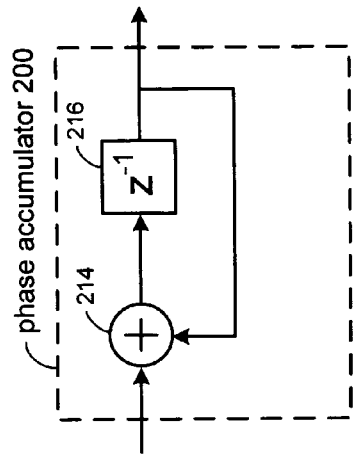
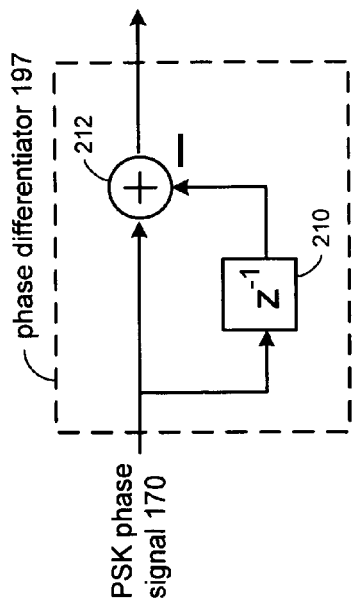
FIG. 5
FIG. 7
FIG. 6

DESIGN METHOD AND IMPLEMENTATION OF OPTIMAL LINEAR IIR EQUALIZERS FOR RF TRANSCEIVERS

CROSS REFERENCE TO RELATED PATENTS

This application is a Continuation-in-Part of, claims priority to, and incorporates by reference the following U.S. Utility Applications under 35 U.S.C. 120:
(1) "A Technique for Improving Modulation Performance of Translational Loop RF Transmitters, having a Ser. No. 10/676,221 and a filing date of Sep. 30, 2003 now U.S. Pat. No. 7,027,780;
(2) "A Digital Delay Element for Delay Mismatch Cancellation in Wireless Polar Transmitters", having a Ser. No. 10/925,485 and a filing date of Aug. 25, 2004;
(3) "Architectural Techniques for Envelope and Phase Signal Alignment in RF Polar Transmitters Using Power Amplifier Feedback", having a Ser. No. 10/954,883 and a filing date of Sep. 30, 2004 now U.S. Pat. No. 7,480,344;
(4) "Digital Algorithm for On-Line ACPR Optimization in Polar RF Transmitters", having a Ser. No. 10/944,551 and a filing date of Sep. 17, 2004 now U.S. Pat. No. 7,372,917;
(5) "Digital Modulator for a GSM/GPRS/EDGE Wireless Polar RF Transmitter", having a Ser. No. 10/944,552 and a filing date of Sep. 17, 2004; and
(6) "Implementation Technique for Linear Phase Equalization in Multi-Mode RF Transmitters", having a Ser. No. 10/954,911 and a filing date of Sep. 30, 2004 now U.S. Pat. No. 7,397,863.

BACKGROUND

1. Technical Field

The present invention relates to wireless communications and, more particularly, wideband wireless communication systems.

2. Related Art

Modern wireless radio frequency (RF) transmitters for applications, such as cellular, personal, and satellite communications, employ digital modulation schemes such as Frequency Shift Keying (FSK) and Phase Shift Keying (PSK), and variants thereof, often in combination with Code Division Multiple Access (CDMA) communication. Independent of the particular communications scheme employed, the RF transmitter output signal, $s_{RF}(t)$, can be represented mathematically as $$s_{RF}(t) = r(t)\cos(2\pi f_c t + \theta(t)) \quad (1)$$

where $f_c$ denotes the RF carrier frequency, and the signal components $r(t)$ and $\theta(t)$ are referred to as the envelope and phase of $s_{RF}(t)$, respectively.

Some of the above mentioned communication schemes have constant envelope, i.e., $$r(t) = R, \quad (2)$$

and these are thus referred to as constant envelope communications schemes. In these communications schemes, $\theta(t)$ constitutes all of the information bearing part of the transmitted signal. Other communications schemes have envelopes that vary with time and these are thus referred to as variable envelope communications schemes. In these communications schemes, both $r(t)$ and $\theta(t)$ constitute information bearing parts of the transmitted signal.

The most widespread standard in cellular wireless communications is currently the Global System for Mobile Communications (GSM). A second generation standard employs Gaussian Minimum Shift Keying (GMSK), which is a constant envelope binary modulation scheme allowing raw transmission at a maximum rate of 270.83 kilobits per second (Kbps). In any mobile communication system the radio spectrum is a very limited resource shared by all users. GSM employs a combination of Time Division Multiple Access (TDMA) and Frequency Division Multiple Access (FDMA) for the purpose of sharing the spectrum resource. GSM networks typically operate in the 900 MHz frequency range. The radio spectrum in the bands 890-915 MHz is for the uplink (mobile station to base station), and 935-960 MHz is for the downlink (base station to mobile station). The spectrum for both uplink and downlink is divided into 200 kHz wide carrier frequencies using FDMA, and each base station is assigned one or more carrier frequencies. Each carrier is divided into eight time slots using TDMA. Eight consecutive time slots form one TDMA frame, with a duration of 4.615 ms. A physical channel occupies one time slot within a TDMA frame. Each time slot within a frame is also referred to as a burst. TDMA frames of a particular carrier frequency are numbered, and formed in groups of 26 or 51 TDMA frames called multi-frames. While GSM is sufficient for standard voice services, future high-fidelity audio and data services demand higher data throughput rates.

General Packet Radio Service (GPRS) is a new non-voice service that allows information to be sent and received across a mobile telephone network. It supplements today's Circuit Switched Data (CSD) and Short Message Service (SMS). GPRS employs the same modulation scheme as GSM, but higher data throughput rates are achievable with GPRS since it allows for all eight time slots to be used by a mobile station at the same time.

Even higher data rates are achieved in the specification of the Enhanced Data rates for GSM Evolution (EDGE) cellular telephony standard by selectively applying a $3\pi/8$ offset, 8-level PSK (8-PSK) modulation scheme. With this variable envelope communication scheme, the maximum bit rate is tripled compared to GSM, while the chosen pulse shaping ensures that the RF carrier bandwidth is the same as that of GSM, allowing for the reuse of the GSM frequency bands. Additionally, to further increase the flexibility of data transmission, so-called multi-slot operation has been introduced into GSM/GPRS/EDGE systems. In multi-slot operation, more than one time slot out of the eight in one GSM frame can be used for transmission with GMSK and/or 8-PSK modulation.

As mentioned above, the GMSK modulation scheme of standard GSM is an example of a constant envelope communications scheme. An example transmitter appropriate for such constant envelope modulation schemes in a mobile station unit is a translational loop transmitter. In this transmitter, the digital baseband data enters a digital processor that performs the necessary pulse shaping and modulation to some intermediate frequency (IF) carrier $f_{IF}$. The resulting digital signal is converted to analog using a digital-to-analog converter (DAC) and a low pass filter (LPF) that filters out undesired digital images of the IF signal. A translational loop, essentially a phase locked loop (PLL), then translates, or up-converts, the IF signal to the desired RF frequency and a power amplifier (PA) delivers the appropriate transmit power to the antenna.

As mentioned above, the 8-PSK modulation scheme of EDGE is an example of a variable envelope communications scheme. In practice, the power spectrum emitted from an EDGE transmitter will not be ideal due to various imperfections in the RF transmitter circuitry. Thus, quality measures of the transmitter performance have been established as part of the EDGE standard and minimum requirements have been set. One quality measure that relates to the RF signal power spectrum is the so-called spectral mask. This mask represents the maximum allowable levels of the power spectrum as a function of frequency offset from the RF carrier in order for a given transmitter to qualify for EDGE certification. In other words, the spectral mask requirements limit the amount of transmitter signal leakage into other users' signal spectrum. For example, at a frequency offset of 400 kHz (0.4 MHz), the maximum allowable emission level is −54 dB relative to the carrier (dBc). Another RF transmitter quality measure of the EDGE standard is the modulation accuracy, which relates the RF transmitter modulation performance to an ideal reference signal. Modulation accuracy is related to the so-called Error Vector Magnitude (EVM), which is the magnitude of the difference between the actual transmitter output and the ideal reference signal. The error vector is, in general, a complex quantity and hence can be viewed as a vector in the complex plane. Modulation accuracy is stated in root-mean-square (RMS), 95th percentile, and peak values of the EVM and is specified as a percentage. For a given transmitter to qualify for EDGE certification, the RMS EVM must be less than 9%, the 95th percentile of EVM values must be less than 15%, and the peak EVM value must be less than 30%.

The increase in system flexibility resulting from the introduction of multi-slot operation in EDGE presents the challenge of finding an efficient implementation of a joint GMSK/8-PSK modulator which enables easy and fast switching between GMSK and 8-PSK modulation in consecutive time slots. Such modulation switching must be achieved within the so-called guard interval, merely 30 microseconds (μs) long. Further complication is encountered in the domain of the RF frequency PA. Exploiting the fact that GMSK is a constant envelope modulation scheme, the PA can typically be driven in saturation mode for higher efficiency when transmitting GSM signals. However, due to the variable envelope properties of the 8-PSK modulation option in EDGE, driving the PA in saturated mode is not possible. Rather, a certain power back-off of the PA input signal level is required to maintain adequate modulation accuracy. Typical transmitter powers may be 33 dBm in GMSK mode and 27 dBm in PSK mode. Thus, when switching modulation schemes in multi-slot operation from GMSK to 8-PSK, or vice versa, a change of PA input signal level must occur. Such change must be achieved within the guard interval and in such a fashion that switching transients do not violate the spectral mask requirements.

Another potential cause of performance degradation of RF polar transmitters is the so-called reference feed-through caused by several phase locked loop component non-idealities, such as non-zero reset delay of the phase frequency detector (PFD) as well as mismatches between the "up" and "down" current sources of the charge pump. Reference feed-through generates tones at the RF output offset by an amount equal to the reference frequency and may lead to violation of the spurious emissions requirements of the EDGE standard. Reference feed-through may be controlled by design of the PLL signal filter. It is desirable that the PLL signal filter transfer function, H(s), equals one for all frequencies. In this case, the PLL signal filter imposes no distortion on the signal and therefore does not introduce modulation error.

In practice, designing the PLL such that H(s)=1, i.e., has infinite bandwidth, is impossible. Firstly, it can be shown that loop stability considerations dictate that the bandwidth of the PLL signal filter be less than about 1/10 of the IF frequency. Thus, for example, for a translational loop with an IF frequency of 26 MHz, H(s) must thus have bandwidth less than 2.6 MHz. Secondly, narrowing the PLL signal filter bandwidth reduces the amount of "feed-through" of the IF reference signal to the RF output signal and is thus a desirable design option. Reference feed-through is the result of several PLL component non-idealities such as non-zero reset delay of the PFD, as well as mismatches between the "up" and "down" current sources of the charge pump. These non-ideal effects create a periodic signal on the voltage controlled oscillator (VCO) control voltage corresponding to the reference frequency and are thus translated to the RF signal as spurious emission. Typically, in a high-speed digital CMOS process, the reset delay of the PFD is a few nanoseconds, and the mismatch of the charge pump current sources 5-10%.

In the prior art, the maximum narrowness of H(s) is mainly dictated by the bandwidth of the signal and the permissible modulation error. For example, in GSM, where the RMS transmitter phase modulation error performance must be better than 5° and the peak modulation error must be better than 20°, designing the PLL filter narrower than 1 MHz leads to prohibitively large modulation errors. In this case, the attenuation of reference feed-through by the PLL filter is limited and, for practical PFD reset delays and charge pump (CP) current source mismatches in a CMOS process, may not suffice to meet the spurious emissions requirements of the GSM standard as stated in the example.

Modulation error as a result of a narrow PLL signal filter is due to both amplitude distortion as well as group delay variation over the signal band of interest. Stated differently, group delay variation causes different frequency components of the transmitter signal to travel through the transmitter at different speeds, thereby causing inter-symbol interference. As an example, for a prior art translational loop, the modulation error resulting from the PLL signal filter is approximately 0.53° RMS. While this amount of modulation error is less than the GSM standard permits, it is typically the maximum that can be allowed in the absence of other non-ideal effects, such as analog circuit noise and non-linearities, component variations due to process variations, and component value fluctuations due to temperature variations. All of these effects add up to form the total modulation error.

Thus, in order to meet spurious emissions requirements, the translational loop RF transmitter PLL signal filter is made sufficiently narrow that worst-case reference feed-through is attenuated below the −112 dBc specification. To enable this approach, digital signal processing is employed in the baseband processor to eliminate the modulation error problems otherwise caused by a narrow PLL signal filter. Specifically, the transmit signal generated by the baseband processor is "pre-distorted" so as to counter act the distortion imposed by a narrow PLL signal filter. This "pre-distortion", or equalization process, typically occurs in two steps: a magnitude equalizer filter pre-distorts the amplitude of the transmit signal according to the inverse of the PLL signal filter magnitude response, and a group delay equalizer filter linearizes the phase response of the entire transmitter chain, i.e., pre-distorts the transmit signal such that the combined phase response of magnitude equalizer, group delay equalizer, and PLL signal filter is linear. Along the same lines, a receiver includes filters including low pass and all-pass filters and other components that introduce distortion in the receive path.

Generally, a need exists, therefore, for designs that pre-distort the amplitude and the phase in polar transmitters for GSM based transmitters, and more generally to transmitters, and that further compensates for introduced distortions of a receive path of a GSM or other based receiver in a demodulator.

SUMMARY OF THE INVENTION

The apparatus and method of the present invention substantially solves these problems by implementing an architecture that employs a new digital processing sequence. Among other aspects of the inventive architecture, equalizers perform equalization prior to phase accumulation within phase accumulators. A phase differentiator receives an envelope path phase signal to produce a differentiated phase signal to the equalizer. The transfer function of the phase differentiator is implemented so that it cancels, except for a one cycle delay, the transfer function of the phase accumulator. This cancellation substantially eliminates accumulation of the envelope path phase signal.

To further improve effectiveness of circuitry that compensates for distortion in the transmit and receive paths of a transceiver, a method and corresponding circuitry is presented herein that facilitates generation of an optimal design for generating said compensation. The method for optimizing a linear equalizer of an RF transceiver generally includes selecting a desired filter response wherein the desired filter response matches a specified analog filter in a signal path, determining filter characteristics of the specified analog filter, generating a discrete time model of the specified analog filter based upon a desired signal filter response and upon the filter characteristics of the specified analog filter; determining a digital filter; determining total signal filtering of the RF transceiver based upon the discrete time model of the specified analog filter and upon characteristics of the digital filter; determining an inverse of the determined total signal filtering; multiplying the inverse of the determined total signal filtering with the determined total signal filtering to determine a desired equalizer filtering characteristic for pre-distorting group delay; optimally matching the desired equalizer filtering characteristic with an IIR magnitude equalizer to determine an optimal approximation of a magnitude response of the discrete time model of the specified analog filter; adding an inverse of the optimal approximation of the magnitude response to the desired equalizer filtering characteristic to determine pre-distorting group delay response of a filter; and optimally matching the pre-distorting group delay response of the filter to obtain an optimal approximation to the pre-distorting group delay response of the filter.

The above-referenced description of the summary of the invention captures some, but not all, of the various aspects of the present invention. The claims are directed to some of the various other embodiments of the subject matter towards which the present invention is directed. In addition, other aspects, advantages, and novel features of the invention will become apparent from the following detailed description of the invention when considered in conjunction with the accompanying drawings.

BRIEF DESCRIPTION OF THE DRAWINGS

FIG. 5 is a schematic block diagram of the phase adjustment section of FIG. 4;

FIG. 6 is a schematic block diagram of a phase differentiator of one embodiment of the present invention;

FIG. 7 is a schematic block diagram of a phase accumulator of one embodiment of the present invention;

DETAILED DESCRIPTION OF THE DRAWINGS

Figure 1:
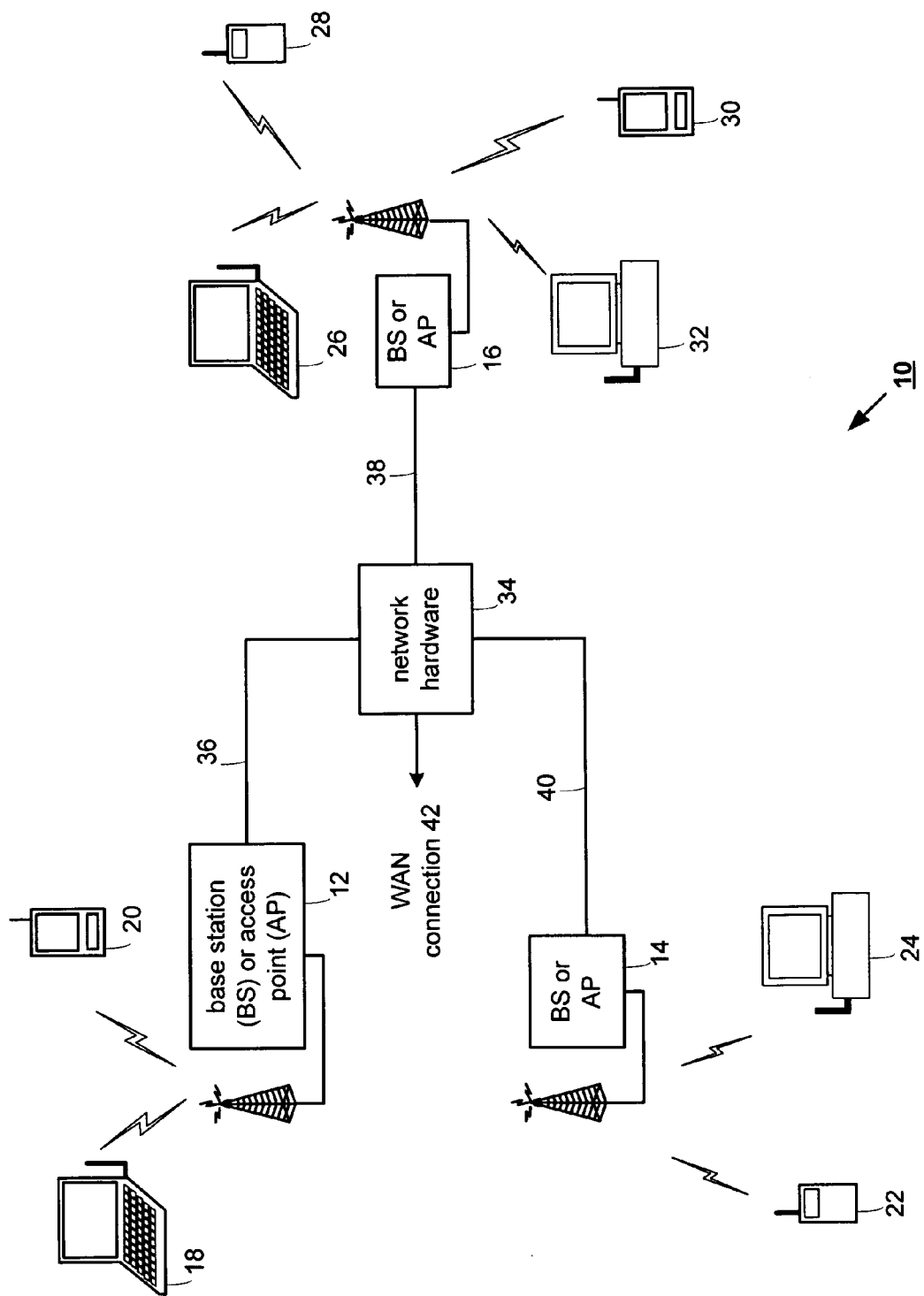
FIG. 1 is a functional block diagram illustrating a communication system that includes a plurality of base stations or access points, a plurality of wireless communication devices, and a network hardware component.

A better understanding of the present invention can be obtained when the following detailed description of the preferred embodiment is considered with the following drawings, in which:

FIG. 1 is a functional block diagram illustrating a communication system 10 that includes a plurality of base stations or access points (APs) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32, and/or cellular telephone hosts 22 and 28. The details of the wireless communication devices will be described in greater detail with reference to FIG. 2.

The base stations or access points 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Any of the hosts may include a digital modulator operable in one of a GSM, General Packet Radio Service (GPRS), and EDGE modulation modes. When operating a multi-mode modulator that switches between modulation modes, GMSK and 8-PSK for example, the present invention substantially limits the accumulation of quantization noise that would otherwise contribute to modulation errors.

Figure 2:
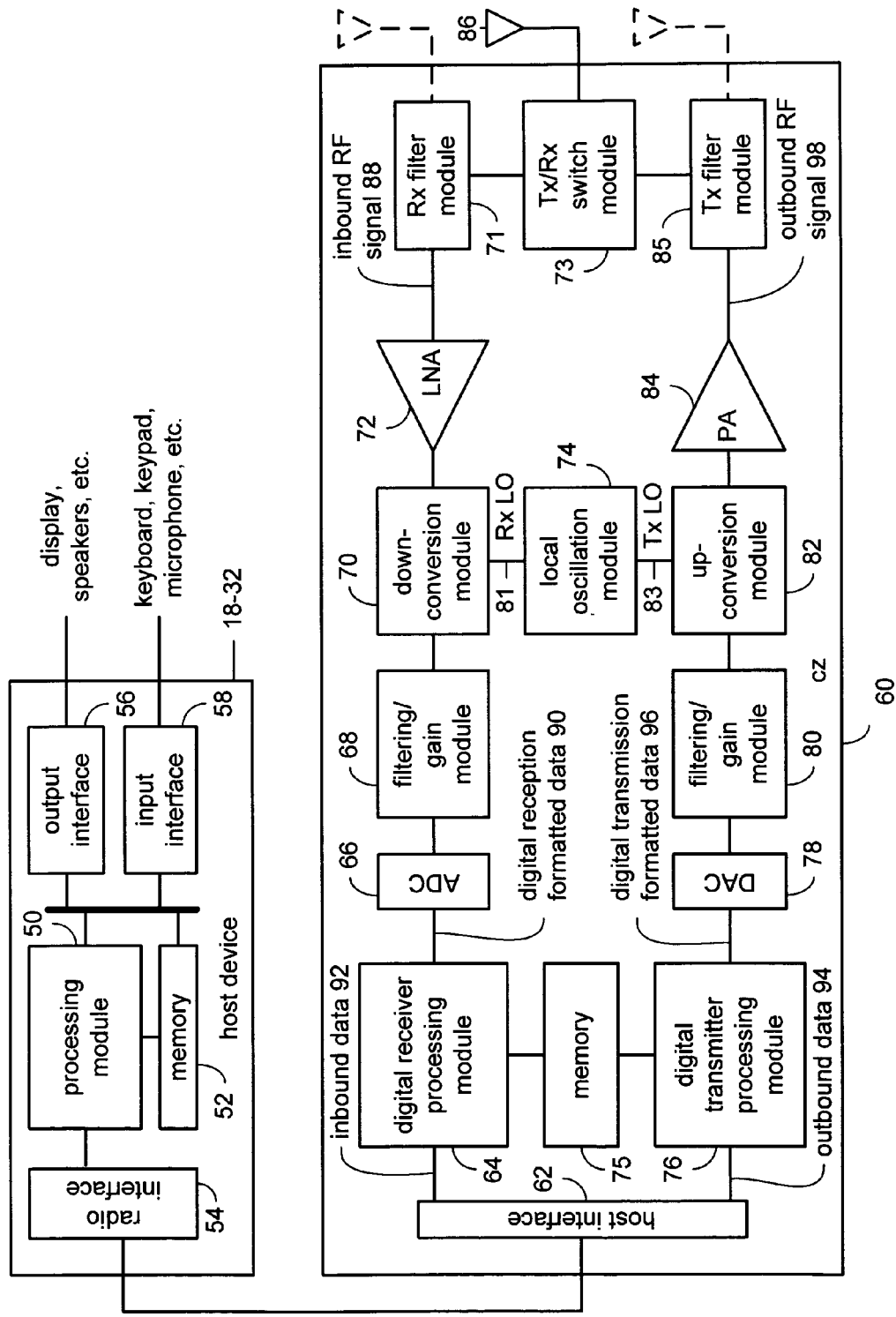
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device, such as a display, monitor, speakers, etc., such that the received data may be displayed. The radio interface 54 also provides data from the processing module 50 to the radio 60. The processing module 50 may receive the outbound data from an input device, such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (TX/RX) switch module 73, a local oscillation module 74, a memory 75, a digital transmitter processing module 76, a digital-to-analog converter 78, a filtering/gain module 80, an intermediate frequency (IF) mixing up-conversion module 82, a power amplifier (PA) 84, a transmitter filter module 85, and an antenna 86. The antenna 86 is shared by the transmit and receive paths as regulated by the TX/RX switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., GSM, EDGE, IEEE 802.11a, IEEE 802.11b, Bluetooth, etc.) to produce digital transmission formatted data 96. The digital transmission formatted data 96 produced by a digital modulator of the present invention will be a digital baseband signal or a digital low IF signal, where the low IF typically will be in the frequency range of 100 KHz to a few megahertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. Local oscillation module 74 is, in one embodiment of the invention, a multi-stage mixer as described herein. The power amplifier 84 amplifies the RF signal to produce an outbound RF signal 98, which is filtered by the transmitter filter module 85. The antenna 86 transmits the outbound RF signal 98 to a targeted device, such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the TX/RX switch module 73, where the RX filter module 71 band pass filters the inbound RF signal

88. The RX filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. Local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of host device 18-32 and the digital receiver processing module 64 and the digital transmitter processing module 76 of radio 60 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

Figure 3A:
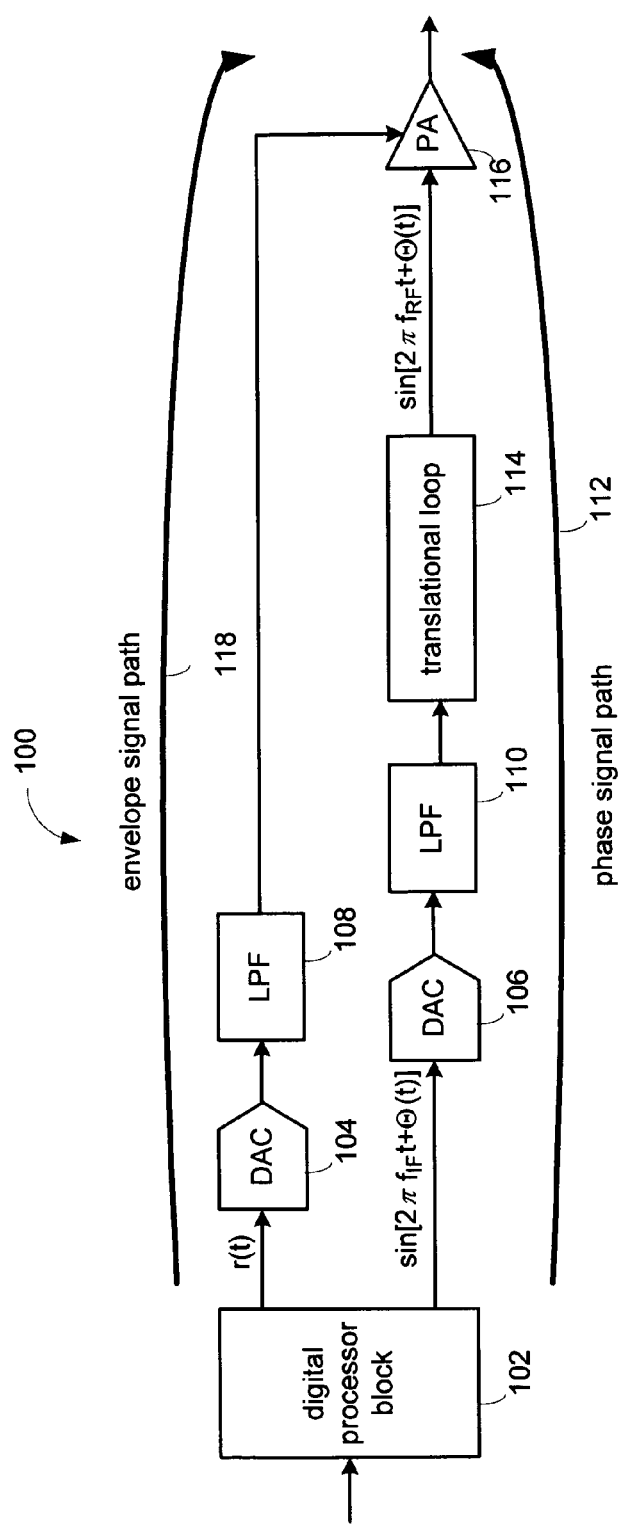
FIG. 3A is a block diagram of an RF transmitter architecture appropriate for non-constant-envelope modulation schemes according to one embodiment of the present invention.

FIG. 3A is a block diagram of an RF transmitter architecture appropriate for non-constant-envelope modulation schemes according to one embodiment of the present invention. The transmitter of FIG. 3A is also referred to as a polar transmitter or an envelope elimination and restoration (EER) transmitter. As can be seen from FIG. 3A, a digital processor block 102 splits outgoing digital baseband data into envelope and phase components, converts the phase components to RF via a translational loop and joins the signals at the RF via an amplitude modulated PA.

More specifically, the envelope components and phase components are produced to first and second digital-to-analog converters (DACs) 104 and 106, respectively, which produce outgoing analog envelope and phase components, respectively, to first and second low pass filters (LPFs) 108 and 110, respectively. First and second LPFs 108 and 110 produce outgoing filtered envelope and phase components, respectively. The phase component, which is processed in a phase signal path shown by arrow 112, is then produced from LPF 110 to translational loop 114. Translational loop 114 then produces an RF frequency phase component, shown in FIG. 3A as "sin $[2\pi f_{RF}t+\theta(t)]$" to power amplifier (PA) 116. The envelope signal component produced by LPF 108 and conducted along an envelope signal path, shown by arrow 118, is then produced to PA 116 to amplitude modulate the phase component received at PA 116 from translational loop 114. Generally, PA 116 generates an output signal for radiation from an antenna by effectively multiplying the envelope signal with the translational loop output, namely, the RF frequency phase component of the phase path. The magnitude of the envelope component (magnitude component) serves to modulate a signal and power level of the power amplifier and more specifically, of the phase modulated signal from the phase path.

Figure 3B:
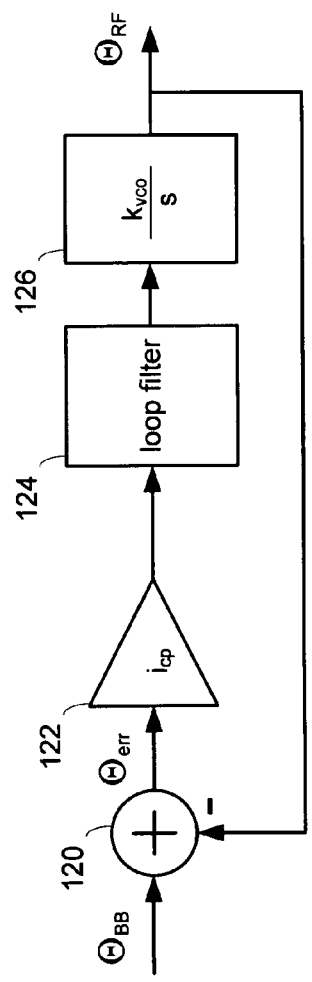
FIG. 3B shows a linearized model of a translational loop according to one embodiment of the present invention.

FIG. 3B shows a linearized model of a translational loop according to one embodiment of the present invention. The linearized model represents the effective signal processing performed by the phase locked loop on the baseband signal as it is translated to the RF. Generally, a translational loop is operable to produce an oscillation as a function of a difference in phase/frequency. As shown in the example of FIG. 3B, a phase signal $\Theta_{BB}$ (a reference signal having a phase component) is produced to a summing node (or comparator) 120 that is further coupled to receive a feedback phase signal $\Theta_{RF}$ that is produced as an output of the translational loop. Summing node 120 produces a phase error signal $\Theta_{err}$ typically to a charge pump that produces a corresponding current. Here, $\Theta_{err}$ is produced to a current source 122 that produces a current as a function of $\Theta_{err}$. A current $i_{cp}$ is produced from current source 122 to a loop filter 124 that produces a corresponding voltage that is proportional to current $i_{cp}$. An oscillator 126 then produces an oscillation based upon the corresponding voltage produced by loop filter 124. In operation, a reference phase signal is compared to a feedback phase signal to generate a current component having a magnitude that is a function of the difference in phases. The current is then produced, typically, to a loop filter that converts the current to a voltage. An oscillator then produces an oscillation as a function of the voltage level. In FIG. 3B, $\Theta_{BB}$ denotes the phase modulation generated by the digital baseband processor, and $\Theta_{RF}$ denotes the phase modulation of the RF output signal.

Figure 3C:
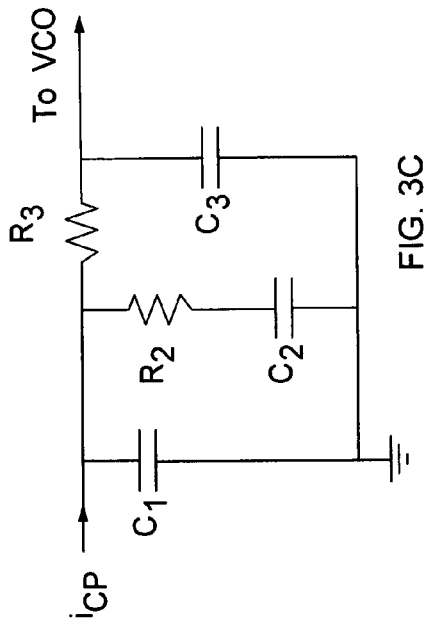
FIG. 3C shows a typical architecture of the loop filter of FIG. 3B.

FIG. 3C shows a typical architecture of the loop filter of FIG. 3B. The transfer function between RF output and baseband processor output can be expressed in terms of charge pump current, $i_{cp}$, loop components, and VCO sensitivity, $k_{VCO}$:

$$H(s) = \frac{\Theta_{RF}}{\Theta_{BB}} = \frac{i_{CP}k_{VCO}(C_2R_2s+1)}{C_1C_2C_3R_2R_3s^4 + (C_1C_3R_3 + C_1C_2R_2 + C_2C_3R_2 + C_2C_3R_3)s^3 + (C_1+C_2+C_3)s^2 + i_{CP}k_{VCO}(C_2R_2s+1)} \quad (3)$$

Subsequently, the transfer function H(s) will be referred to as the PLL signal filter. Ideally, it is desirable that H(s)=1 such that $\Theta_{RF}=\Theta_{BB}$ for all frequencies. In this case, the PLL signal filter imposes no distortion on the signal and therefore does not introduce modulation error. However, in practice, designing the PLL such that H(s)=1, i.e., has infinite bandwidth, is impossible. For one, it can be shown that loop stability considerations dictate that the bandwidth of the PLL signal filter be less than about 1/10 of the IF frequency, i.e., for the example PLL, H(s) must thus have bandwidth less than 2.6 MHz. Secondly, narrowing the PLL signal filter bandwidth reduces the amount of "feed-through" of the IF reference signal to the RF output signal and is thus a desirable design option. Reference feed-through is the result of several PLL component non-idealities, such as non-zero reset delay of the PFD, as well as mismatches between the "up" and "down" current sources of the charge pump. These non-ideal effects create a periodic signal on the VCO control voltage corresponding to the reference frequency and are thus translated to the RF signal as spurious emission. Typically, in a high-speed digital CMOS process, the reset delay of the PFD is a few nano seconds, and the mismatch of the charge pump current sources 5-10%.

Figure 4:
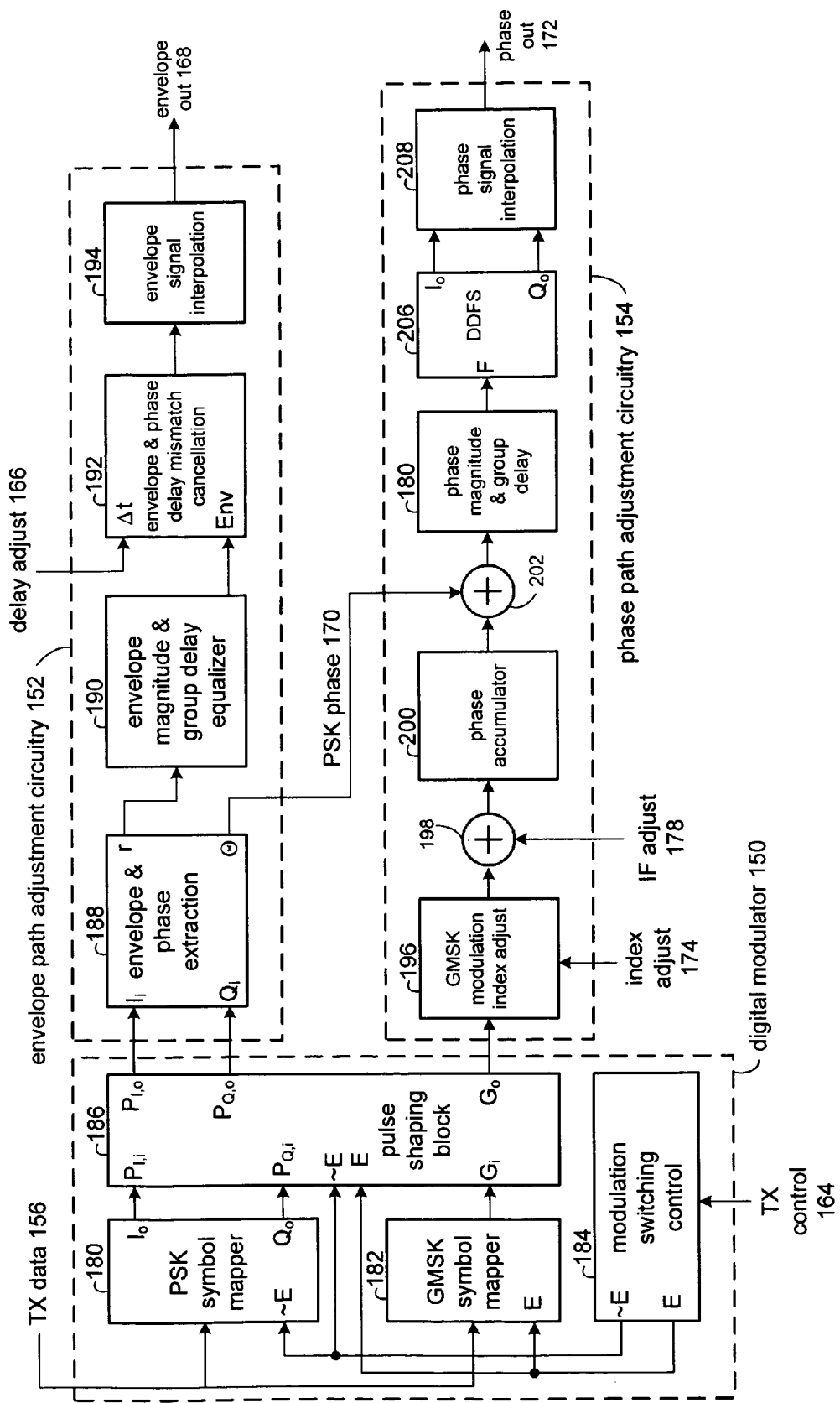
FIG. 4 is a schematic block diagram of digital modulator circuitry that allows for switching between modulation schemes while adhering to spectral mask requirements that include compensation blocks to pre-distort outgoing signals according to one embodiment of the present invention.

FIG. 4 is a schematic block diagram of digital modulator circuitry that allows for switching between modulation schemes while adhering to spectral mask requirements that include compensation blocks to pre-distort outgoing signals according to one embodiment of the present invention. The digital modulator circuitry includes a plurality of processing blocks, namely digital modulator 150, envelope path adjustment circuitry 152, and phase path adjustment circuitry 154, to produce a digital modulator suitable for a GSM, a GPRS, or an EDGE wireless RF polar transmitter. The digital modulator circuitry is generally applicable to any RF polar transmitter. In the described embodiment of FIG. 4, the digital modulator is directed to the EDGE standard though it may be used to support continuous switching between PSK and GMSK modes.

As shown here in FIG. 4, digital modulator 150 receives TX data 156 and a modulator control signal, TX control 164. The TX data 156 consists of either single-bit data for GMSK modulation or three-bit data for 8-PSK modulation. The TX data 156 bits are mapped to transmitter symbols by a PSK symbol mapper 180 and a GMSK symbol mapper 182. Modulation switching control 184 enables one of PSK symbol mapper 180 or GMSK symbol mapper 182 based on a setting of TX control 164. The symbols produced by PSK symbol mapper 180 and the GMSK symbol mapper 182 are operably coupled to pulse shaping block 186 where the symbols are pulsed shaped by a plurality of transmit filters. The process of pulse shaping ensures that the transmitted RF signal is sufficiently band limited so as to not interfere excessively with adjacent RF channels. Specifically, pulse shaping block 186 implements Infinite Impulse Response (IIR) filters for the pulse shaping, consisting of a Gaussian filter with a BT product of 0.3 for the GMSK transmit mode, where the term "BT" denotes the product of filter bandwidth (B) and the symbol time (T). A similar filter is employed for the PSK mode. The BT product represents a degree of filtering and is derived from the product of the filter 3 dB bandwidth and the bit period of the transmission. The PSK filtered symbols produced by pulse shaping block 186 are complex, consisting of in-phase (I) and quadrature (Q) components.

Envelope and phase extraction 188 extracts the envelope and phase of the PSK signal and splits the processing paths of the two signal components. An envelope signal is subsequently processed by an envelope magnitude and group delay equalizer 190 that pre-distorts the envelope magnitude and group delay response to counter-act non-ideal processing by the analog components of the transmitter. Envelope magnitude and group delay equalizer 190 and a phase accumulator 200 provide digital pre-distortion of the envelope signal and phase signal, respectively. The transmitter contains analog components that impose a certain amount of distortion on the transmitted signal. Such distortion can largely be categorized as magnitude variation and group delay variation. If left uncompensated, such distortion typically leads to degraded modulator performance in the form of unacceptable modulation errors, including spectral mask requirement violations. The equalizers of FIG. 4 are digital filters and can be either Finite Impulse Response (FIR) or Infinite Impulse Response (IIR), or a combination thereof, according to design preference, and may be divided into two separate sections; one section that pre-distorts the magnitude response and one section that pre-distorts the group delay response.

Envelope and phase delay mismatch cancellation 192 imposes a programmable delay on the envelope signal specified by a parameter delay adjust 166. The sampling rate of the envelope signal is then increased to an appropriate value by envelope signal interpolation 194, which also performs appropriate signal quantization to remove most of the quantization noise. The sampling rate of the envelope signal is increased to an appropriate or desired value according to design requirements by envelope signal interpolation 194. Envelope signal interpolation 194 also performs signal quantization.

The pulse shaped Gaussian signal, Go, produced by pulse shaping block 186 is typically produced with a modulation index that is nominally set to 0.5. The signal Go, however, can be fine adjusted by GMSK modulation index adjust 196 based on index adjust 174. The resulting signal is operably coupled to a summing junction 198 where it is summed with an IF adjust signal 178 to fine adjust the IF frequency, if necessary.

The output of summing junction 198 is then produced to phase accumulator 200. Phase accumulator 200 adds the incoming phase signal with a previous (in time) phase signal delayed by one bit period. The resulting summed phase signal is combined with the phase component of the PSK signal, namely, PSK phase signal 170. As previously discussed, adding the PSK phase signal 170 provides a smooth transition during the transition from PSK to GMSK modulation modes. Phase magnitude and group delay equalizer 204 pre-distorts the signal from a summing junction 202 to counter-act distortion imposed by subsequent processing by the analog transmitter components. The pre-distorted signal is up-converted by Direct Digital Frequency Synthesizer (DDFS) 206 then the sampling rate of the modulated complex signal is increased to an appropriate value by phase signal interpolation 208, which also performs appropriate signal quantization. Phase signal interpolation 208 is appropriate for the EDGE RF polar transmitter architecture. The 3.25 MHz $I_o$ and $Q_o$ input signals are up-converted by a 32× up-converter to 104 MHz then low pass filtered and mixed with a local oscillation to extract the signal information from the in-phase and quadrature signals $I_o$ and $Q_o$, respectively. The resultant signals are summed to produce phase output signal 172.

Envelope and phase extraction 188 converts the PSK in-phase and quadrature components produced by pulse shaping block 186 to a phase component, θ, and a magnitude component, "r". The phase component, PSK phase signal 170, is operably coupled to summing junction 202 in the phase path, while the magnitude component is operably coupled to envelope magnitude and group delay equalizer 190. The equalized signal is operably coupled to envelope and phase delay mismatch cancellation 192. Envelope and phase delay mismatch cancellation 192 consists of digital circuitry that implements a programmable delay of the envelope signal, as specified by the parameter delay adjust 166. This allows for fine adjustment of the envelope signal delay and hence delay mismatch cancellation between envelope and phase signal paths.

Envelope signal interpolation 194 produces an envelope out 168 from the envelope and phase adjusted signal. The sampling rate of the envelope signal is increased to an appropriate value by envelope signal interpolation 194, which also performs appropriate signal quantization. Problematic aspects of the digital modulator circuitry of FIG. 4, in a practical implementation, is the GMSK phase accumulator and the addition of the PSK phase signal after the phase accumulator prior to the phase magnitude and group delay equalization. The problems arise in that the input to the phase magnitude and group delay equalization cannot be allowed to "wrap-around" such as may be encountered in two's complement arithmetic. The bit length of the accumulator nodes could be made larger to avoid phase "wrap-around", but this is impractical for very long continuous-mode transmissions where the absolute value of the phase may approach very large values.

FIGS. 5, 6 and 7 are functional schematic block diagrams that illustrate embodiments of various aspects and portion of the digital modulation circuitry. More specifically, FIG. 5 is a schematic block diagram of the phase adjustment section of FIG. 4. The signal transfer function of phase differentiator 197 shown in FIG. 6 is $$H_{DIFF}(z) = 1 - z^{-1} \quad (4)$$

and the signal transfer function of phase accumulator 200 shown in FIG. 7 is $$H_{INT}(z) = \frac{z^{-1}}{1 - z^{-1}}. \quad (5)$$

Thus, $$H_{DIFF}(z) \times H_{INT}(z) = z^{-1} \quad (6)$$

and hence, aside from a single signal delay, the phase accumulation processing in the PSK signal path is neutralized to avoid uncontrolled accumulation of quantization noise.

FIG. 6 is a schematic block diagram of a phase differentiator of one embodiment of the present invention. Phase differentiator 197 includes a delay element 210 and a summing node 212. PSK phase signal 170 is operably coupled to an input of delay element 210 and to an input of summing node 212 that subtracts a one cycle delayed sample of PSK phase signal 170 from the output signal to neutralize the processing of the phase accumulator. The phase accumulator has a transfer function of $$H_{DIFF}(z) = 1 - z^{-1}. \quad (7)$$

FIG. 7 is a schematic block diagram of a phase accumulator of one embodiment of the present invention. Phase accumulator 200 includes a summing node 214 and a delay element 216. Summing node 214 adds a one cycle delayed output signal with the input signal to produce a linearly increasing or accumulated phase signal. The transfer function of phase accumulator 200 is $$H_{INT}(z) = \frac{z^{-1}}{1 - z^{-1}}. \quad (8)$$

Figure 8:
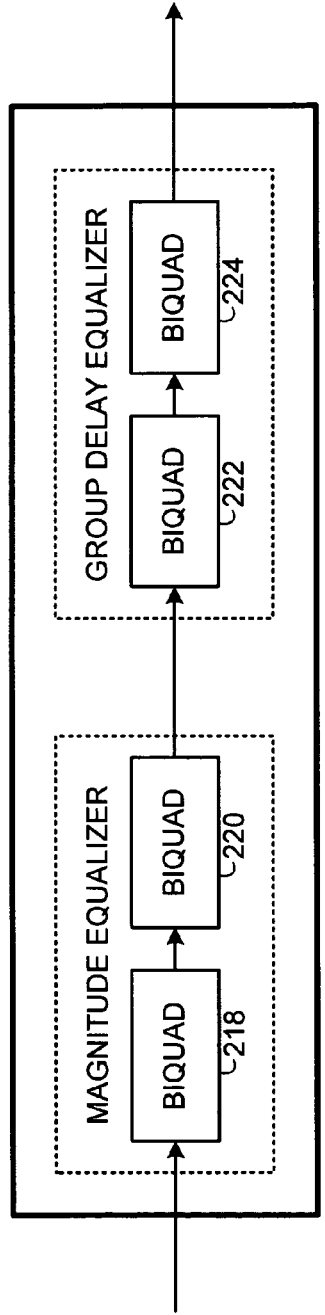
FIG. 8 is a functional block diagram of a magnitude and group delay equalizer of one embodiment of the present invention.

FIG. 8 is a functional block diagram of a magnitude and group delay equalizer of one embodiment of the present invention. The equalizer is implemented as a magnitude equalizer followed by a group delay equalizer. The magnitude equalizer includes a cascade of second order IIR filters, or biquads, namely biquad 218 and 220, while the group delay equalizer includes a cascade of biquads, namely biquad 222 and biquad 224. Each equalizer is implemented as a fourth order IIR filter (a digital filter).

The magnitude equalizer has a transfer function of $$H_{BQ}(z) = \frac{b_0 + b_1 z^{-1} + b_2 z^{-2}}{1 + a_1 z^{-1} + a_2 z^{-2}}, \quad (9)$$

and the group delay equalizer has an all-pass transfer function of $$H_{BQ}(z) = \frac{c_0 + c_1 z^{-1} + z^{-2}}{1 + c_1 z^{-1} + c_0 z^{-2}}. \quad (10)$$

The all-pass transfer function of the group delay equalizer changes the phase response to insure a constant group delay. It follows that the transfer function of the equalizer is $$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}}. \quad (11)$$

One aspect of the present invention as shown in FIG. 8 includes implementation of signal equalization in two stages, namely magnitude equalization, where the magnitude response of the RF transceiver over the signal bandwidth is closely approximated to a desired response, e.g., a response for a square root raised cosine (RRC) filter, and group delay equalization where the group delay response of the RF transceiver over the signal bandwidth is closely approximated to a desired response. Typically, but not necessarily, the desired group delay response is constant, corresponding to linear phase response. In one embodiment of the invention such equalizers are implemented as IIR filters.

Figure 9B:
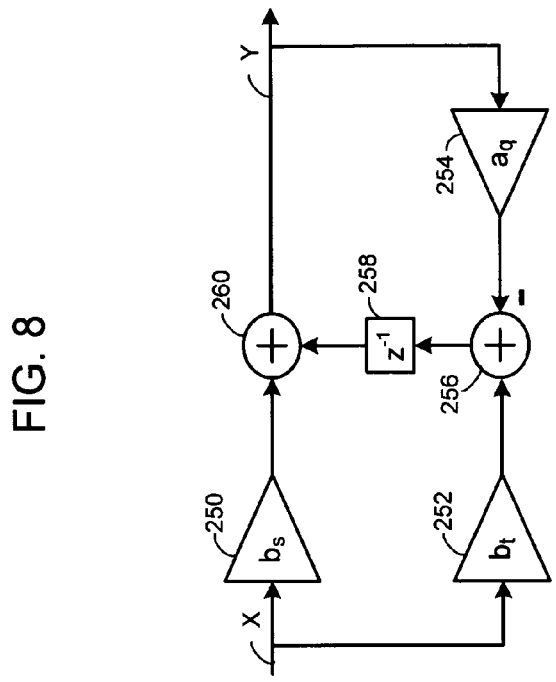
FIG. 9B is a schematic block of a biquad according to an embodiment of the present invention.
Figure 9A:
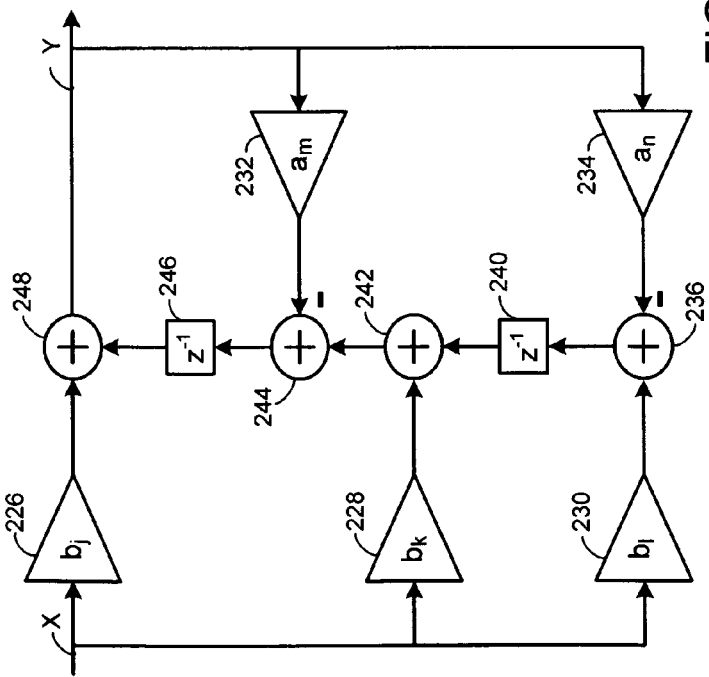
FIG. 9A is a schematic block diagram of a biquad according to an embodiment of the present invention.

FIG. 9A is a schematic block diagram of a biquad according to an embodiment of the present invention. The biquad includes a plurality of feed forward multipliers 226-230 and feedback multipliers 232 and 234 that multiply the input signal X and output signal Y, respectively, by appropriate coefficients $b_0$, $b_1$, $b_2$, $-a_1$, and $-a_2$. Summing junction 236 produces a first summed output from the outputs of multipliers 230 and 234 and couples the first summed output to delay element 240. The delayed output is summed in summing junction 242 with multiplier 228 output to produce a second summed output. Multiplier 232 multiplies the output signal Y by coefficient $-a1$. The multiplied signal is summed in summing junction 244 with the second summed output to produce a third summed output. After a delay produced by delay element 246, the third summed output is summed in summing junction 248 with the output of multiplier 226 to produce the filter output Y.

The biquad has a transfer function of the form $$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}}, \quad (12)$$

and the biquad determinant is defined as $$N_{BQ}(z) = \frac{1}{1 + a_1 z^{-1} + a_2 z^{-2}}. \quad (13)$$

As may further be seen in FIG. 9B, a first order biquad may also be used in conjunction with one or more second order bi-quads to generate a desired level of filtration. Thus, the first order biquad of FIG. 9B includes a plurality of feed forward multipliers 250-252 and a feedback multiplier 254 that multiply the input signal X and output signal Y, respectively, by appropriate coefficients $b_s$, $b_t$, and $-a_q$. Summing junction 256 produces a first summed output from the outputs of multipliers 252 and 254 and couples the first summed output to delay element 258. The delayed output is summed in summing junction 260 with an output of multiplier 250 to produce a second summed output (the output of the first order biquad).

Figure 10:
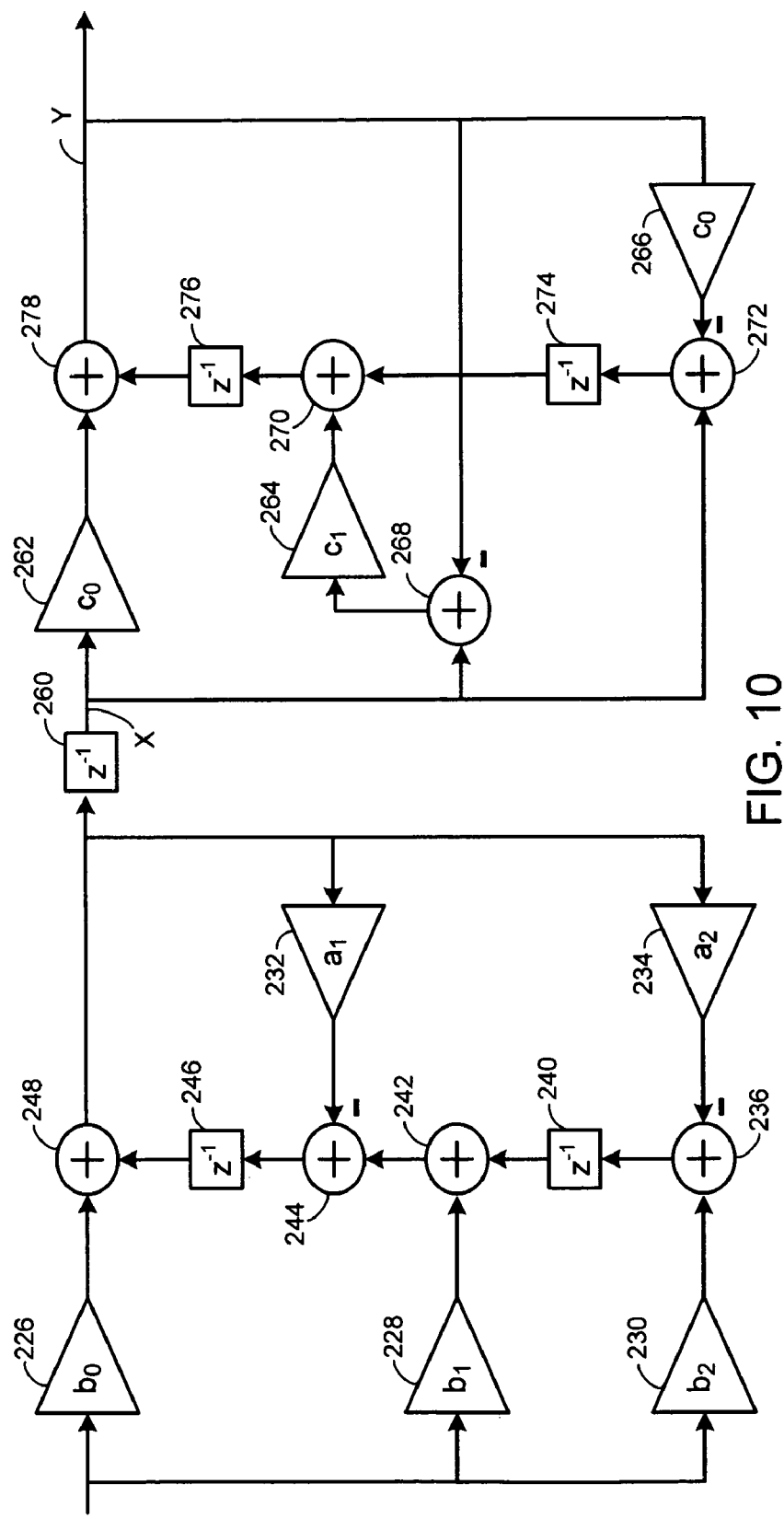
FIG. 10 illustrates an efficient implementation of a cascade of second order magnitude equalizer and group delay equalizer.

FIG. 10 illustrates an efficient implementation of the cascade of second order magnitude equalizer and group delay equalizer developed in the above examples. The second order biquad of FIG. 9A is coupled to a second biquad, also a second order biquad, in the described embodiment of the invention though separated by a delay element. Specifically, a delay element 260 separates the two second order biquads. The added second order biquad of FIG. 10 shown to the right of delay element 260 comprises a plurality of feed forward multipliers 262-264 and a feedback multiplier 266 that multiply the input signal X and output signal Y, respectively, by appropriate coefficients $c_0$, $c_1$, and $-c_0$. Summing junction 268 produces a first summed output from the output Y of the second biquad and from an input of the second biquad received from delay element 260. Multipliers 264 produces a multiplied output multiplied by a value of $c_1$ to a second summing junction 270.

Feedback multiplier 266 multiplies the output Y of the second biquad by a coefficient of $-c_0$ and produces a multiplied feedback element to summing junction 272. Summing junction 272 is further coupled to receive the input of the second biquad from delay element 260 to produce a summed output to delay element 274. Summing junction 270 is coupled to receive the output of multiplier 264 and delay element 274 to produce a summed value to delay element 276. The delayed output from delay element 276 is summed in summing junction 278 with an output of multiplier 262 to produce the output Y of the second biquad of FIG. 10.

Generally, FIGS. 8, 9 and 10 illustrate various configurations of biquads according to various embodiments of the invention. These first, second and fourth order biquads illustrate potential combinations of biquads according to a final design developed according to the embodiments of the inventive methods described below. With respect to the added biquad of FIG. 10, only two distinct multipliers are needed for the group delay equalizer due to the anti-symmetry of the numerator and denominator. The concept of the equalizer implementation shown in FIG. 10 can be extended to higher order equalizers, as well. To extend to higher orders, notice that the poles and zeros of the equalizers are either real or occur in complex conjugate pairs. Thus, the magnitude and group delay equalizer transfer functions may be written as $$H_{GE}(z) = \prod_{k=1}^{N_r} \frac{z^{-1} - d_k^*}{1 - d_k z^{-1}} \prod_{k=1}^{N_c} \left( \frac{z^{-1} - e_k^*}{1 - e_k z^{-1}} \frac{z^{-1} - e_k}{1 - e_k^* z^{-1}} \right) \quad (14)$$

where Nr denotes the number of real poles and Nc denotes the number of complex poles. It then follows from linear systems theory that the equalizer can be implemented as a cascade of biquads and first order stages as shown in FIGS. 9 and 10.

To achieve an optimal equalizer as illustrated in FIGS. 8, 9 and 10 for use in either a transmitter or a receiver to properly modulate an outgoing signal or demodulate an ingoing signal, an 8-step algorithm is disclosed for designing such equalizers. As a part of the explanation, a discussion of properties of IIR filters as employed by the described embodiment of the invention is given and each design step of the algorithm is discussed in mathematical detail.

The following is the 8-step algorithm employed for RF transceiver linear equalizer design according to one embodiment of the invention:

8-Step Optimal Linear IIR Equalizer Design Algorithm:

STEP 1: Determine the desired signal filter response, e.g., square-root raised cosine.

STEP 2: Determine the analog signal filtering of the RF transceiver and generate a discrete time model.

STEP 3: Determine the digital signal filtering of the RF transceiver.

STEP 4: The total signal filtering of the RF transceiver is determined as the combined filtering of STEP 2 and STEP 3.

STEP 5: The desired filtering of STEP 1 is multiplied with the inverse of the filtering determined in STEP 4. This yields the desired equalizer filtering.

STEP 6: Design an IIR magnitude equalizer to match the response in STEP 5 optimally so as to obtain an optimal approximation to the magnitude response defined in STEP 1.

STEP 7: The inverse of the group delay variation of the IIR magnitude equalizer of STEP 6 is added to the group delay found in the previous STEP 5.

STEP 8: Design an optimal IIR group delay equalizer to match the response in STEP 7 optimally so as to obtain an optimal approximation to the group delay response defined in STEP 1.

Discussion of Properties of IIR Filters as Employed by the Embodiments of the Invention This embodiment of the invention proposes to implement the above-mentioned equalizers as IIR filters. Specifically, an Nth order magnitude equalizer with real-valued coefficients of the form $$H_{ME}(z) = \frac{\sum_{i=0}^{N} b_i z^{-i}}{1 + \sum_{i=0}^{N} a_i z^{-i}} \quad (15)$$

and an Nth order group delay equalizer with real-valued coefficients of the form $$H_{GE}(z) = \frac{\sum_{i=0}^{N-1} c_i z^{-i} + z^{-N}}{1 + \sum_{i=1}^{N} c_{N-i} z^{-i}}. \quad (16)$$

Thus, the magnitude equalizer Fourier transform is $$H_{ME}(e^{j\omega}) = \frac{\sum_{i=0}^{N} b_i e^{-j\omega i}}{1 + \sum_{i=1}^{N} a_i e^{-j\omega i}} \quad (17)$$

and the group delay equalizer Fourier transform is $$H_{GE}(e^{j\omega}) = \frac{\sum_{i=0}^{N-1} c_i e^{-j\omega i} + e^{-j\omega N}}{1 + \sum_{i=1}^{N} c_{N-i} e^{-j\omega i}}. \tag{18}$$

The magnitude response of a discrete-time filter H(z) is denoted $$|H(e^{j\omega})| \tag{19}$$

and for a rational function may be written as $$|H(e^{j\omega})| = \frac{\left|\sum_{i=0}^{M} b_i e^{-j\omega i}\right|}{\left|1 + \sum_{i=1}^{M} a_i e^{-j\omega i}\right|}. \tag{20}$$

The phase response of a discrete-time filter H(z) is denoted $$\angle H(e^{j\omega}) \tag{21}$$

and for a rational function may be written as $$\angle H(e^{j\omega}) = \angle \left( \frac{\sum_{i=0}^{M} b_i e^{-j\omega i}}{1 + \sum_{i=1}^{M} a_i e^{-j\omega i}} \right) \tag{22}$$

$$= \angle \sum_{i=0}^{M} b_i e^{-j\omega i} - \angle \left(1 + \sum_{i=1}^{M} a_i e^{-j\omega i}\right).$$

The group delay of a discrete-time filter H(z) is defined by $$grd\{H(e^{j\omega})\} = -\frac{d}{d\omega}\{\angle H(e^{j\omega})\} \tag{23}$$

and for a rational function may be written as $$grd\{H(e^{j\omega})\} = \frac{d}{d\omega}\left\{\angle\left(1 + \sum_{i=1}^{M} a_i e^{-j\omega i}\right)\right\} - \frac{d}{d\omega}\left\{\angle \sum_{i=0}^{M} b_i e^{-j\omega i}\right\}. \tag{24}$$

Detailed Discussion of Each IIR Equalizer Design Step:

Discussion of STEP 1: Often times, determining the desired signal filter response follows directly from the specification of the communications standard in question. For example, in enhanced data rate (EDR) Bluetooth, the specification is that the transmitter must implement an RRC filter with a roll-off factor of 0.4. For an EDR receiver, optimal signal reception is achieved if the receiver signal filter closely resembles that of an RRC filter with a roll-off factor of 0.4. In the following, let the desired signal filter response over the desired signal band be denoted by $$H_{DES}(e^{j\omega}), \omega \in \text{Desired Signal Band}. \tag{25}$$

Discussion of STEP 2: In order to eventually design discrete-time equalizers such that the total signal filtering of the RF transceiver closely resembles that of the desired response from STEP 1, a discrete-time model for the front-end analog signal filtering must first be developed. For a receiver, the sampling time chosen for this model typically equals the sampling rate of the receiver ADC(s); for a transmitter, the sampling rate chosen for this model typically equals the sampling rate of the DAC(s). To determine the analog signal filtering of the RF transceiver and generate a discrete-time model, the method developed in Example 3 is used. This method can then be referred to as the "Impulse response Invariance Transformation" because it transforms an analog filter to a discrete-time system with identical impulse response functions. In the following, let the discrete-time function achieved by the transformation in Example 3 corresponding to a continuous time analog filter $H_{CT}(s)$ be denoted by $$H_{DT}(z) \tag{26}$$

Discussion of STEP 3: The digital signal filtering of the RF transceiver can easily be determined from the demodulator circuitry. Typically, for receivers, the filtering involves decimation filters and sharp, hardware efficient channel select filters. For transmitters, the digital filtering typically involves interpolation filtering. In the following, let the digital signal filtering of the RF transceiver be denoted by $$H_{DIG}(z) \tag{27}$$

Discussion of STEP 4: The total signal filtering of the RF transceiver is determined as the combined filtering of STEP 2 and STEP 3 over the signal bandwidth of interest. Thus, denoting the frequency response of the total signal filtering $H_{TOT}(e^{j\omega})$ one may write $$H_{TOT}(e^{j\omega}) = H_{DT}(e^{j\omega}) \times H_{DIG}(e^{j\omega}), \omega \in \text{Desired Signal Band} \tag{28}$$

Notice here that the discrete-time frequency, omega, is defined to be constrained to the desired signal band. Also notice that for each of the filter components of $$H_{TOT}(e^{j\omega}) \tag{29}$$

this may be a different range relative to the sampling rate of the filter component since sampling rates may be different at different stages of the transceiver.

Discussion of STEP 5: The desired filtering of STEP 1 is multiplied with the inverse of the filtering determined in STEP 4, yielding the desired equalizer filtering response over the desired signal band. To see this, notice that the equalizer filtering response $$H_{EQ}(e^{j\omega}) \tag{30}$$

is designed to satisfy $$H_{DES}(e^{j\omega}) = H_{TOT}(e^{j\omega}) \times H_{EQ}(e^{j\omega}) = H_{DT}(e^{j\omega}) \times H_{DIG}(e^{j\omega}) \times H^{EQ}(e^{j\omega}) \tag{31}$$

Thus, $$H_{EQ}(e^{j\omega}) = H_{TOT}^{-1}(e^{j\omega}) \times H_{DES}(e^{j\omega}) = H_{DT}^{-1}(e^{j\omega}) \times H_{DIG}^{-1}(e^{j\omega}) \times H_{DES}(e^{j\omega}), \omega \in \text{Desired Signal Band} \tag{32}$$

Discussion of STEP 6: To design the magnitude equalizer, the order, N, of the IIR filter must first be decided upon. In general, the equalizer more closely approximates the desired response calculated in STEP 5 for larger values of N. Of course, this comes at an increase in implementation cost since higher order filters require larger die area and consume more power than lower order filters. Once the order N has been determined, the IIR filter coefficients $a_1, \ldots, a_N$ and $b_0, \ldots, b_N$ as defined in (15) are found by solving the multi-variable optimization problem Minimize{max($|H_{EQ}(e^{j\omega})|-|H_{ME}(e^{j\omega})|$), $\omega \in$ Desired Signal Band} Subject to $H_{ME}(z)$ being a stable filter (33)

In the above, the magnitude response of the entire equalizer, i.e., the cascade of magnitude equalizer and group delay equalizer, is equal to the magnitude response of the magnitude equalizer. In other words, the magnitude response of the group delay equalizer is unity for all frequencies. This property is shown in Example 4 discussed in the following section.

The above optimization problem is typically too complex to be solved analytically, but must instead be solved numerically. A variety of numerical optimization algorithms exist to solve such multi-variable problems. For example, an unconstrained quasi-Newton algorithm may be employed, where any poles outside the unit circle are reflected back inside the unit circle. Notice that this gives rise to a so-called "equi-ripple" solution, where the maximum positive deviation of $$|H_{ME}(e^{j\omega})| \quad (34)$$

from the desired response $$|H_{EQ}(e^{j\omega})| \quad (35)$$

is equal to the maximum negative deviation. Typically, such equi-ripple design is done in the log-domain so that the equi-ripple property holds for units of decibels (dB). Examples of such equi-ripple design are given in a subsequent section.

Discussion of STEP 7: While the group delay equalizer does not affect the magnitude response of the entire signal equalizer, the magnitude equalizer in general does affect the signal group delay. Thus, the inverse of the group delay variation of the IIR magnitude equalizer of STEP 6 is added to the group delay found in the previous STEP 5 in order to determine the group delay response of the group delay equalizer.

Discussion of STEP 8: Typically, only group delay variation is of interest and the IIR filter coefficients $c_1, \ldots, c_N$ of an Mth order group delay equalizer as defined in (16) are found by solving the multi-variable optimization problem Minimize{max($grd(H_{GE}(e^{j\omega}))-K$), $\omega \in$ Desired Signal Band} Subject to $H_{GE}(z)$ being a stable filter (36)

where K is some arbitrary constant. Again, the above optimization problem is typically too complex to be solved analytically, but must instead be solved numerically. As for the magnitude equalizer, this gives rise to a so-called "equi-ripple" solution, where the maximum positive deviation of $$grd(H_{GE}(e^{j\omega})) \quad (37)$$

from the desired response

K is equal to the maximum negative deviation. Examples of such equi-ripple design are given in the subsequent section.

EXAMPLE 1

Consider a Bessel type IF filter with a bandwidth of 750 kHz. The poles of such a filter are given in the following table and are specified in Radians/s:

| | |
|---|---|
| $p_0$ | $-6232962.864 + j0$ |
| $p_1$ | $-4935799.388 + j4708922.718$ |
| $p_2$ | $-4935799.388 - j4708922.718$ |

In this example, there is one real-valued pole and a pair of complex conjugate poles. Accordingly, the discrete-time equivalent filter corresponding to the impulse response invariance transformation with a sampling rate of 48 MHz is given by $$H(z) = \frac{\sum_{i=0}^{3} n_i z^{-i}}{\sum_{i=0}^{3} d_i z^{-i}} \quad (38)$$

where

| $n_0$ | 0.0 | and | $d_0$ | 1.0 |
|---|---|---|---|---|
| $n_1$ | 0.00040186635016 | | $d_1$ | $-2.67410967399988$ |
| $n_2$ | 0.00147778089687 | | $d_2$ | 2.39130122581122 |
| $n_3$ | 0.00033979923321 | | $d_3$ | $-0.71497210533110$ |

Figure 11:
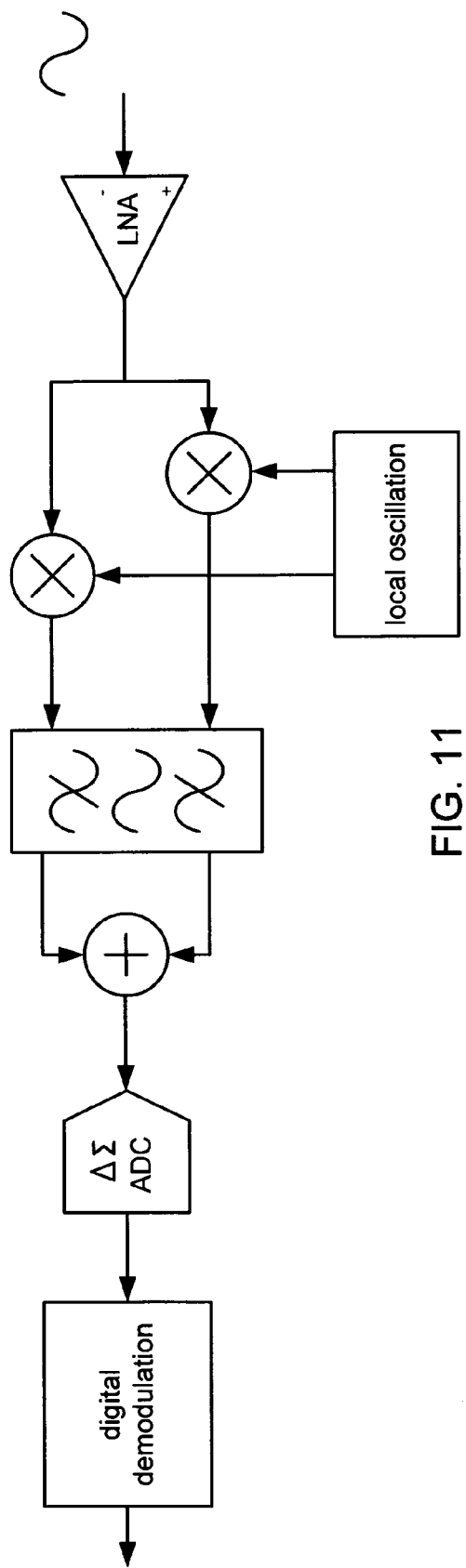
FIG. 11 is a functional block diagram of a receiver that includes a digital demodulation block formed according to one embodiment of the invention.

FIG. 11 is a functional block diagram of a receiver that includes a digital demodulation block formed according to one embodiment of the invention. FIG. 11 illustrates but one example of a receiver with a filter that affects signal magnitude and group delay. The examples herein for compensating such affected signal magnitude and group delay may be used for the receiver of FIG. 11 to change the frequency response of the signal path to closely resemble that of an RRC signal filter with a roll-off factor of 0.4. It is understood that the embodiments of the invention are not limited to compensating for filters with such characteristics.

Figure 12:
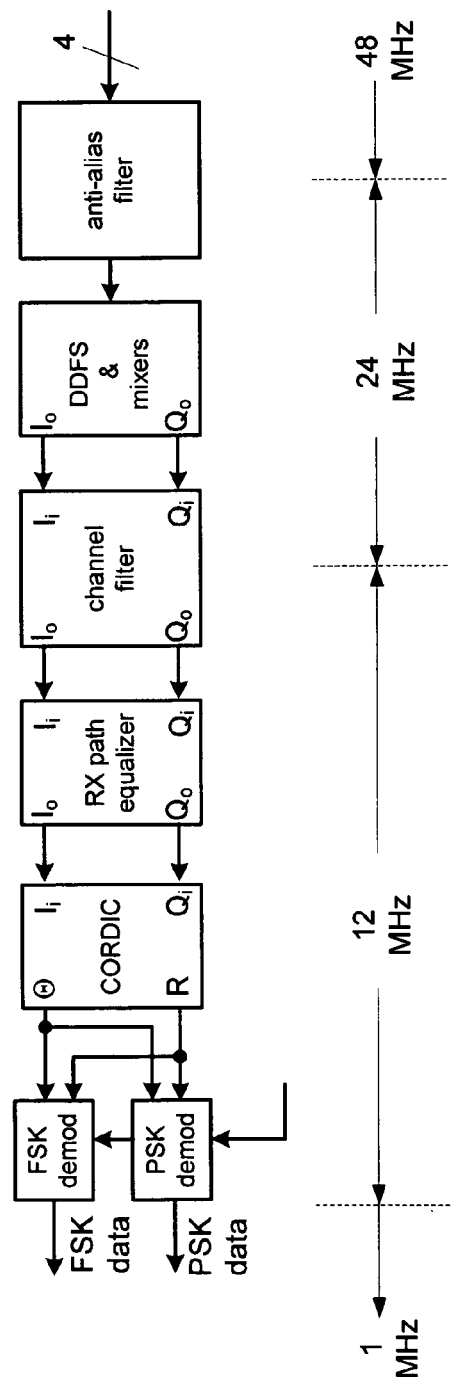
FIG. 12 is a top level functional block diagram of one embodiment of the invention.

FIG. 12 is a top level functional block diagram of illustrating one embodiment of a digital demodulation block constructed according to the present invention. For example, the Digital Demodulator block of FIG. 11 may comprise circuitry similar to FIG. 12 in one embodiment of the invention. Clock rates appropriate for the application of the receiver in the Bluetooth Medium Rate Standard are indicated in the bottom of the figure. Starting from the right, the receiver consists of a simple Anti-Aliasing Filter, whose main purpose is to lower the sampling rate of the digital input signal to 24 MHz, followed by a Direct Digital Frequency Synthesizer (DDFS) and mixers, which translate the signal from the 2 MHz IF to DC. A narrowband Channel Filter filters out the desired signal and rejects undesired interferers and noise. The resulting signal is "equalized" using an RX Path Equalizer, details of which are given shortly. A COordinate Rotation DIgital Computer (CORDIC) then extracts phase and amplitude information out of the received signal which is delivered to either an FSK demodulator or a PSK demodulator, depending upon the mode of modulation. For exemplary purposes, if the desired receiver as shown in FIG. 11 includes an RRC signal filter with a roll-off factor 0.4, a digital demodulation block of one embodiment of the invention would be formed as illustrated in FIG. 12 to compensate for error introduced by the RRC signal filter.

Figure 13:
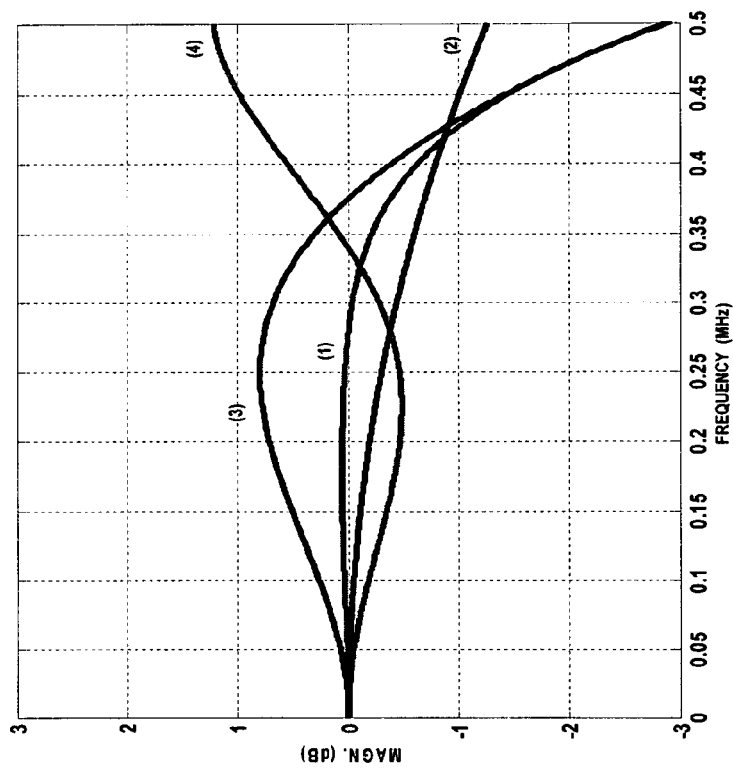
FIG. 13 is a magnitude response graph that illustrates a method according to one embodiment of the present invention.

FIG. 13 illustrates the magnitude responses of (1) square-root raised cosine filter with roll-off factor 0.4, (2) discrete-time model of the 750 kHz-bandwidth filter, (3) digital channel select filter, and (4) desired optimal equalizer and generally illustrates a method according to one embodiment of the present invention. Solving the optimization problem listed above at (46) with equal-ripple constraints for a fourth order equalizer, i.e., a cascade of two biquads, yields $$H_{ME}(z) = \frac{b_0 + b_1 z^{-1} + b_2 z^{-2}}{1 + a_1 z^{-1} + a_2 z^{-2}} \quad (39)$$

and solving (36) yields $$H_{GE}(z) = \frac{c_0 + c_1 z^{-1} + z^{-2}}{1 + c_1 z^{-1} + c_0 z^{-2}} \quad (40)$$

where

| | | | | |
|---|---|---|---|---|
| $b_0$ | 1.22731514735647 | and | $c_0$ | 0.66840659624231 |
| $b_1$ | -2.21400838114118 | | $c_1$ | -1.61215916930441 |
| $b_2$ | 1.02139302806670 | | | |
| $a_1$ | -1.76262869826090 | | | |
| $a_2$ | 0.79744737975766 | | | |

The magnitude response error of a second order IIR equalizer relative to the desired magnitude equalizer response shown in FIG. 12 is generally flat and, for a frequency range of interest, stays within +/-0.1 dB.

EXAMPLE 2

Consider a Butterworth type IF filter with a bandwidth of 800 kHz. The poles of such a filter are given in the following table and are specified in Radians/s:

| | |
|---|---|
| $p_0$ | -4900884.539 + j0 |
| $p_1$ | -2450442.269 + j4244290.5123 |
| $p_2$ | -2450442.269 + j4244290.5123 |

In this example, there is one real-valued pole and a pair of complex conjugate poles. Accordingly, the discrete-time equivalent filter corresponding to the impulse response invariance transformation with a sampling rate of 48 MHz is given by $$H(z) = \frac{\sum_{i=0}^{3} n_i z^{-i}}{\sum_{i=0}^{3} d_i z^{-i}} \quad (41)$$

where

| | | | | |
|---|---|---|---|---|
| $n_0$ | 0.0 | and | $d_0$ | 1.0 |
| $n_1$ | 0.00017172983538655 | | $d_1$ | -2.79466810430244 |
| $n_2$ | 0.00065234568198411 | | $d_2$ | 2.60987701931729 |
| $n_3$ | 0.00015495988000063 | | $d_3$ | -0.81422987961748 |

Suppose the desired receiver signal filter is a RRC with a roll-off factor of 0.4. FIG. 13 shows the magnitude responses of (1) square-root raised cosine filter with roll-off factor 0.4, (2) discrete-time model of the 800 kHz-bandwidth Butterworth filter, (3) digital channel select filter, and (4) desired optimal equalizer. It should be noted that, for the particular derivations, the magnitude responses for the Butterworth filter and the Bessel filter described above yield a similar magnitude plot. Accordingly, FIG. 13 is used herein to illustrate such responses for both filters.

Solving the optimization problem (33) with equal-ripple constraints for a fourth order equalizer, i.e., a cascade of two biquads, yields $$H_{ME}(z) = \frac{b_0 + b_1 z^{-1} + b_2 z^{-2}}{1 + a_1 z^{-1} + a_2 z^{-2}} \quad (42)$$

and solving (36) yields $$H_{GE}(z) = \frac{c_0 + c_1 z^{-1} + z^{-2}}{1 + c_1 z^{-1} + c_0 z^{-2}} \quad (43)$$

where

| | | | | |
|---|---|---|---|---|
| $b_0$ | 2.13533071795703 | and | $c_0$ | 0.68862866174033 |
| $b_1$ | -3.50256401767219 | | $c_1$ | -1.63457800352361 |
| $b_2$ | 1.42837325372283 | | | |
| $a_1$ | -1.22660430171789 | | | |
| $a_2$ | 0.28715559216498 | | | |

As before, the magnitude response error of a second order IIR equalizer relative to the desired magnitude equalizer response shown in FIG. 12 is within +/-0.1 dB.

EXAMPLE 3

Discrete-Time Equivalent Model of the RF Transceiver Signal Filtering

In the following, a discrete-time model equivalent for the analog RF transceiver signal filter is derived. It is assumed that the signal filter can be represented as a rational function without repeated poles; that is, the Laplace transform of the signal filter can be written as $$H(s) = \frac{\sum_{i=0}^{N-1} b_i s^i}{\sum_{i=0}^{M-1} a_i s^i} = \sum_{i=0}^{M-1} \frac{c_i}{s + p_i} \quad (57)$$

where N<M and all $c_i$ are different.

Figure 14:
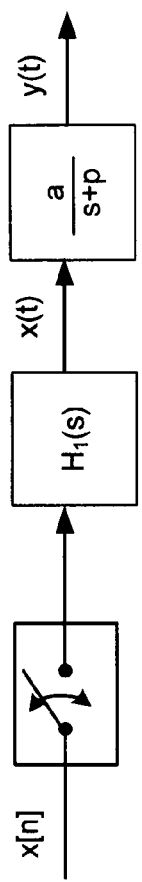
FIG. 14 is a functional block diagram of a single-pole continuous-time system with zeroeth-order sample-and-hold function $H_1(s)$.

FIG. 14 is a functional block diagram of a single-pole continuous-time system with zeroeth-order sample-and-hold function $H_1(s)$. To find the discrete-time equivalent filter with sampling period T, consider first the one-pole system depicted in FIG. 14. It will be shown that the discrete-time equivalent filter of this one-pole analog filter is given by:

$$H(z) \equiv \frac{Z\{y(nT)\}}{X(z)} = \frac{a}{b} \frac{(1 - e^{-pT})z^{-1}}{1 - e^{-pT}z^{-1}} \quad (45)$$

The principle of superposition that the discrete-time equivalent of the filter (19) is given by $$H_{DT}(z) = \sum_{i=0}^{M-1} \frac{a_i}{b_i} \frac{(1-e^{-p_iT})z^{-1}}{1-e^{-p_iT}z^{-1}} = \frac{\sum_{i=0}^{M} n_i z^{-i}}{\sum_{i=0}^{M} d_i z^{-i}}. \quad (46)$$

In the following let $$H_1(s) = \frac{1-e^{-sT}}{s}$$

$$H_2(s) = \frac{b}{s+a} \quad (47)$$

and let u(t) and δ(t) denote the unit-step function and unit-impulse function, $$H(s) = H_1(s) \times H_2(s) \quad (48)$$
$$= \frac{1-e^{-sT}}{s} \frac{b}{s+a}$$
$$= \frac{b}{a}(1-e^{-sT})\left(\frac{1}{s} - \frac{1}{s+a}\right)$$
$$\Rightarrow$$

respectively. Then $$h(t) = \frac{b}{a}[(1-e^{-at})u(t) - (1-e^{-a(t-T)})u(t-T)]$$
$$\Rightarrow$$
$$h(nT) = \frac{b}{a}[u(nT) - u((n-1)T)] - \frac{b}{a}[e^{-anT}u(nT) -$$
$$e^{-a(n-1)T}u((n-1)T)]$$
$$= \frac{b}{a}\delta(nT) - \frac{b}{a}[f(nT) - f((n-1)T)]$$

where $f(nT) = e^{-anT}u(nT)$

Now, $$F(z) \equiv Z\{f(nT)\} = \frac{1}{1-e^{-aT}z^{-1}}$$

and $Z\{\delta(nT)\}=1$.

Thus, $$H(z) \equiv Z\{h(nT)\} \quad (49)$$
$$= \frac{b}{a} - \frac{b}{a}\left[\frac{1}{1-e^{-aT}z^{-1}} - \frac{z^{-1}}{1-e^{-aT}z^{-1}}\right]$$

-continued
$$= \frac{b}{a} \frac{1-e^{-aT}z^{-1}}{1-e^{-aT}z^{-1}} - \frac{b}{a} \frac{1-z^{-1}}{1-e^{-aT}z^{-1}}$$
$$= \frac{b}{a} \frac{(1-e^{-aT})z^{-1}}{1-e^{-aT}z^{-1}}$$

which completes the derivation.

All Pass Property of the Group Delay Equalizer.

It follows from the above that the magnitude response of the group delay equalizer (16) is unity for all frequencies. To see this, a theorem from algebra is employed that states that rational functions of the form (16) with zeros $$d_k^*, k=1\ldots N \quad (50)$$

have poles of the form $$\left(\frac{1}{d_k^*}\right)^* = \frac{1}{d_k} \quad (51)$$

and thus 29) may be written in pole-zero form as $$H_{GE}(z) = \prod_{k=1}^{N} \frac{z^{-1}-d_k^*}{1-d_k z^{-1}} \quad (52)$$
$$= \prod_{k=1}^{N} \frac{z^{-1}-d_k^*}{1-d_k z^{-1}} \frac{z^{-1}-d_N^*}{1-d_N z^{-1}}$$

Then $$|H_{GE}(e^{j\omega})| = \left|\prod_{k=1}^{N} \frac{e^{-j\omega}-d_k^*}{1-d_k e^{-j\omega}} \frac{e^{-j\omega}-d_N^*}{1-d_N e^{-j\omega}}\right| \quad (53)$$
$$= \left|\prod_{k=1}^{N} \frac{e^{-j\omega}-d_k^*}{1-d_k e^{-j\omega}}\right| \left|\frac{e^{-j\omega}-d_N^*}{1-d_N e^{-j\omega}}\right|$$
$$= \left|\prod_{k=1}^{N} \frac{e^{-j\omega}-d_k^*}{1-d_k e^{-j\omega}}\right| \times \left|e^{-j\omega} \frac{1-d_N^* e^{j\omega}}{1-d_N e^{-j\omega}}\right|$$
$$= \left|\prod_{k=1}^{N} \frac{e^{-j\omega}-d_k^*}{1-d_k e^{-j\omega}}\right| |e^{-j\omega}| \left|\frac{(1-d_N e^{-j\omega})^*}{1-d_N e^{-j\omega}}\right|$$
$$= \left|\prod_{k=1}^{N} \frac{e^{-j\omega}-d_k^*}{1-d_k e^{-j\omega}}\right| \times 1 = \ldots = \prod_{k=1}^{N} 1 = 1,$$

which completes the derivation. It follows that the group delay equalizer does not affect the magnitude response of the signal filter.

Figure 15:
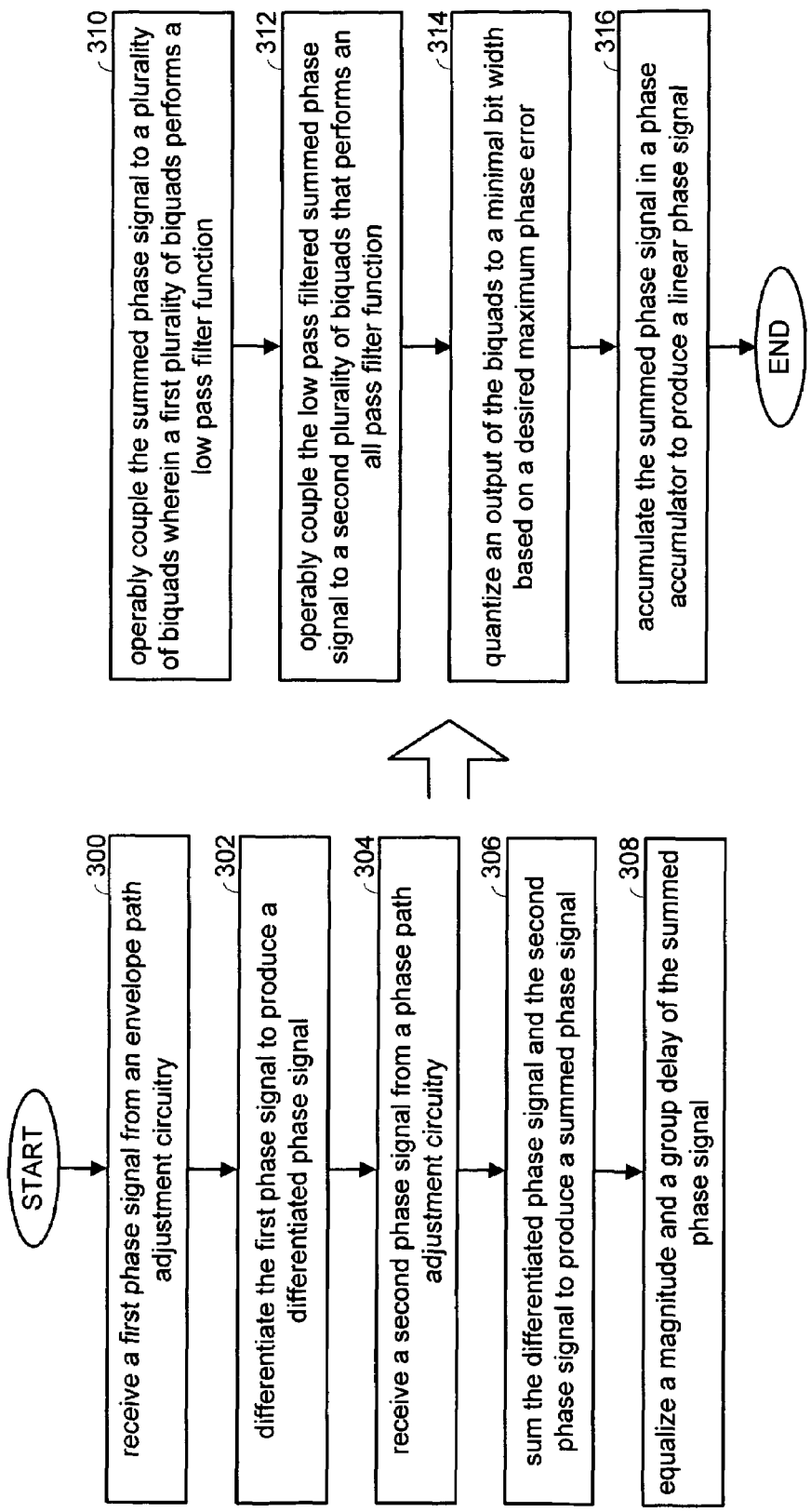
FIG. 15 is a flow chart of a method for linear phase equalization in an RF polar transmitter.

FIG. 15 is a flow chart of a method for linear phase equalization in an RF polar transmitter. Generally, the equalization may be performed with a plurality of equalization blocks further comprising first and second order biquads or any combination thereof. The method here includes phase path adjustment circuitry operably coupled to receive a first phase signal from an envelope path adjustment circuitry (step 300). The first phase signal represents a PSK phase signal extracted from the in-phase and quadrature PSK signals in the phase path adjustment circuitry. A phase differentiator in the phase path adjustment circuitry differentiates the first phase signal to produce a differentiated phase signal (step 302).

A summing node in the phase path adjustment circuitry receives a second phase signal from a phase path adjustment circuitry (step 304) wherein the second phase signal represents the GMSK phase signal. The summing node sums the differentiated phase signal and the second phase signal to produce a summed phase signal (step 306). The summed phase signal produces a smooth transition when switching between modulation modes. A phase magnitude and group delay equalizer equalizes a magnitude and a group delay of the summed phase signal (step 308). In order to equalize the summed phase signal, the method operably couples the summed phase signal to a plurality of biquads wherein a first plurality of biquads performs a low pass filter function (step 310) then operably couples the low pass filtered summed phase signal to a second plurality of biquads that performs an all pass filter function (step 312).

The biquads of the present embodiments of the invention are implemented as second order IIR filters with known feed forward and feedback coefficients. In order to limit the bit width of the biquad output, quantizer nodes are added to the biquads to quantize an output of the biquads to a minimal bit width based on a desired maximum phase error of the phase accumulator output (step 314). For example, in the circuit of FIG. 10, if 16-bit coefficients are employed and L=12, then M=16+L=28, and N may be as coarse as 16. The method further includes injecting one of a flooring equalizer and a rounding equalizer to each quantization node to truncate or round, respectively, the quantizer output to the minimal bit width. Additionally, the method includes adding a dither signal to each biquad quantizer node to spectrally shift quantization noise to white noise. Thereafter, the method accumulates the summed phase signal in a phase accumulator to produce a linear phase signal (step 316).

Figure 16:
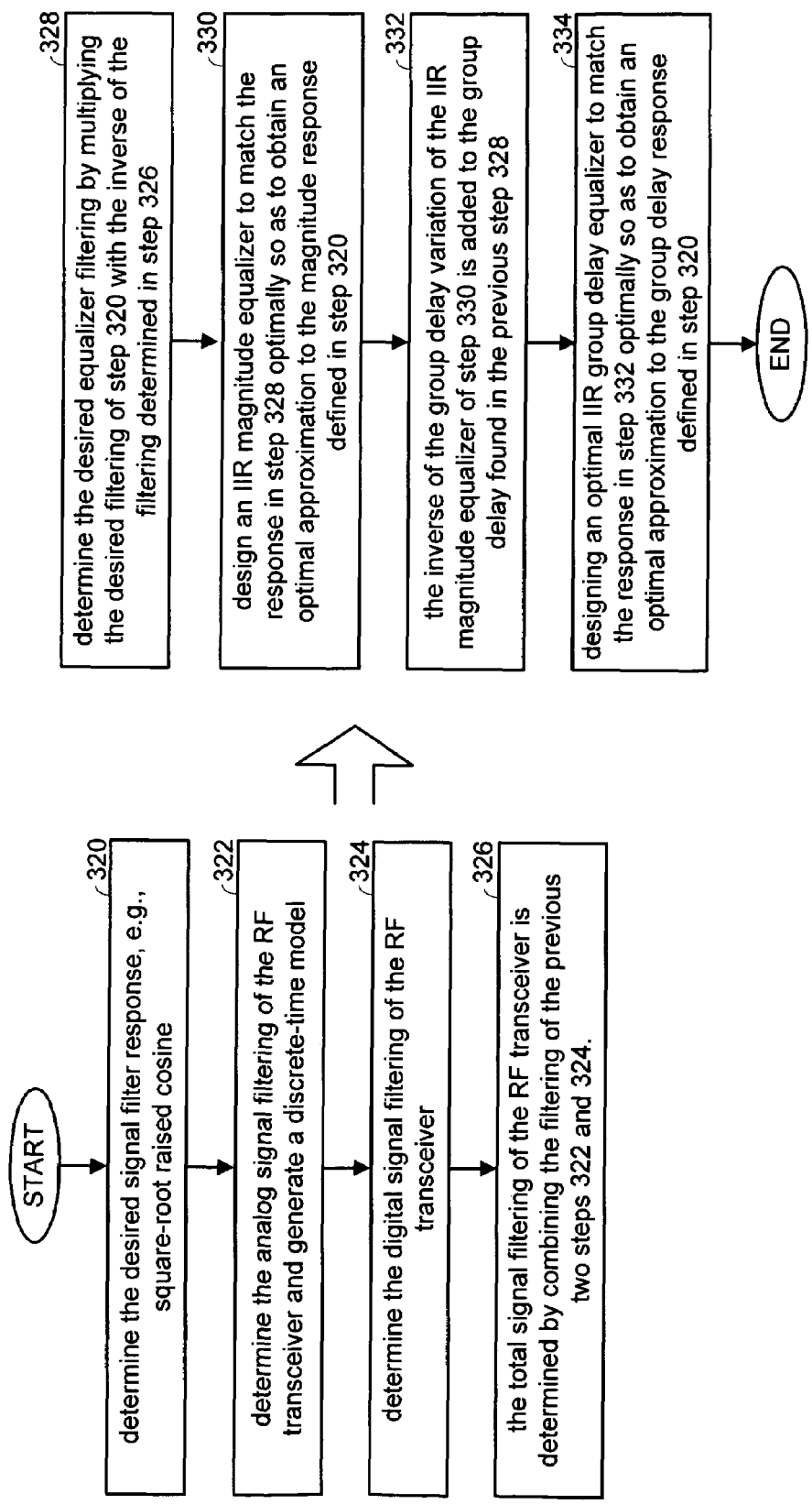
FIG. 16 is a flow chart that illustrates one method of designing one of a demodulator or a modulator according to one embodiment of the invention.

FIG. 16 is a flow chart that illustrates one method of designing one of a demodulator or a modulator according to one embodiment of the invention. Generally, the method of FIG. 16 includes determining the desired signal filter response, e.g., square-root raised cosine (step 320) and determining the analog signal filtering of the RF transceiver and generating a discrete-time model (step 322). Thereafter, the invention includes determining the digital signal filtering of the RF transceiver (step 324) and determining the total signal filtering of the RF transceiver as the combined filtering of steps 322 and 324 (step 326).

Thereafter, the method includes multiplying the desired filtering of step 320 with the inverse of the filtering determined in step 326 (step 328). This yields the desired equalizer filtering. Thereafter, the method includes designing an IIR magnitude equalizer to match the response in step 328 optimally so as to obtain an optimal approximation to the magnitude response defined in step 320 (step 330).

The inverse of the group delay variation of the IIR magnitude equalizer of step 330 is then added to the group delay found in the previous step 328 (step 332). Finally, the method includes designing an optimal IIR group delay equalizer to match the response in step 332 optimally so as to obtain an optimal approximation to the group delay response defined in step 320 (step 334).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A radio frequency (RF) receiver, comprises:
   an analog filter characterized by defined poles and zeroes that is operable to receive and filter an ingoing analog signal and to produce an ingoing filtered signal;
   analog-to-digital conversion (ADC) circuitry operable to produce an ingoing digital signal based upon the ingoing filtered signal;
   digital down conversion circuitry for reducing a sample rate of the digitized ingoing filtered signal and for translating the ingoing filtered signal to base band frequency to produce an ingoing base band frequency signal;
   a narrow band digital channel select filter operable to pass components of the ingoing base band frequency signal within a defined channel and to reject interferers and noise outside of the defined channel to produce an ingoing digital signal within a frequency band of interest;
   a digital equalizer communicatively coupled to receive the ingoing digital signal within the frequency band of interest, the digital equalizer comprising a plurality of second order Infinite Impulse Response (IIR) filters that operate upon the ingoing digital signal within the frequency band of interest to compensate for distortion introduced into the signal by any one of the narrow band digital channel select filter or the analog filter to produce a compensated ingoing digital signal;
   a Coordinate Rotation Digital Computer (CORDIC) that is operable to extract and produce phase and amplitude information from the compensated ingoing digital signal, and
   a demodulator operable to demodulate and extract data from the phase and amplitude information;
   wherein filter coefficients of the plurality of second order IIR filters are based upon optimized values to modify a magnitude response produced from at least one of the analog filter and the digital channel select filter; and
   wherein the filter coefficients are selected to counteract a group delay response.

2. The RF receiver of claim 1 wherein the digital equalizer is operable to generate a filter response characteristic that, when combined with the analog filter response and the filter response of the digital channel select filter, substantially approximates a square-root raised cosine filter response.

3. The RF receiver of claim 1 wherein the plurality of second order IIR filters are operable to jointly form a fourth order IIR filter.

4. The RF receiver of claim 1 wherein the plurality of second order IIR filters are operable to jointly form an "Nth" order IIR filter wherein "N" is greater than or equal to four.

5. The RF receiver of claim 1 wherein a desired filter response based upon equalizer filter response with total filter response including added distortion from all filtering outside of the equalizer is a square-root raised cosine filter response.

6. The RF receiver of claim 1 wherein the analog filter is a band pass filter and further wherein the signal path equalizer is a receive path signal demodulator that produces a compensated filter response that compensates for introduced distortion.

7. The RF receiver of claim 1 wherein the analog filter is one of a Bessel filter or a Butterworth filter.

8. A radio frequency (RF) polar transmitter, comprises:
digital modulator circuitry producing one of a Phase Shift Keying (PSK) or a Gaussian Minimum Shift Keying (GMSK) modulated digital outgoing signal;
digital-to-analog converters for converting the modulated digital outgoing signal to an analog outgoing signal;
low pass filters for filtering an envelope signal path component and a phase signal path component of the analog outgoing signal;
translational loop comprising a loop filter for upconverting the phase signal path component of the filtered analog outgoing signal to RF;
a power amplifier that produces a power amplified outgoing RF based on the RF phase signal path component and the filtered envelope signal path component; and
wherein the digital modulator circuitry comprises:
a plurality of second order IIR filters wherein filter coefficients of the plurality of second order Infinite Impulse Response (IIR) filters have specified values to modify the modulated digital outgoing signal by pre-distorting a corresponding component of the phase path component and the envelope path component of the modulated digital outgoing signal to compensate for at least one of group delay or signal magnitude error or filter distortion to the analog outgoing signal introduced in the transmit path by at least one of the low pass filters or the loop filter;
an envelope magnitude and group delay equalizer that produces an envelope component; and
an envelope and phase delay mismatch cancellation block that adjusts the envelope component based upon a delay adjust signal.

9. The RF transmitter of claim 8 wherein a signal path equalizer is operable to generate a filter response characteristic that substantially approximates a square-root raised cosine filter response.

10. The RF transmitter of claim 8 wherein the plurality of second order IIR filters are operable to jointly form a fourth order IIR filter.

11. The RF transmitter of claim 8 wherein the plurality of second order IIR filters are operable to jointly form an "Nth" order IIR filter wherein "N" is greater than or equal to four.

12. A method for optimizing a linear equalizer of radio frequency (RF) transceiver, comprising:
selecting a desired filter response wherein the desired filter response matches an ideal filter response for a specified analog filter in a signal path;
determining filter characteristics of the specified analog filter;
generating a discrete time model of the specified analog filter based upon a desired signal filter response and upon the filter characteristics of the specified analog filter;
determining a digital filter;
determining total signal filtering of the RF transceiver based upon the discrete time model of the specified analog filter and upon characteristics of the digital filter;
determining an inverse of the determined total signal filtering;
multiplying the inverse of the determined total signal filtering with the determined total signal filtering to determine a desired equalizer filtering characteristic for pre-distorting group delay;
optimally matching the desired equalizer filtering characteristic with an IIR magnitude equalizer to determine an optimal approximation of a magnitude response of the discrete time model of the specified analog filter;
adding an inverse of the optimal approximation of the magnitude response to the desired equalizer filtering characteristic to determine pre-distorting group delay response of a filter; and
optimally matching the pre-distorting group delay response of the filter to obtain an optimal approximation to the pre-distorting group delay response of the filter.

13. The method for optimizing a linear equalizer of an RF transceiver of claim 12 wherein the desired filter response is for a square-root raised cosine filter response having a specified roll-off factor.

14. The method for optimizing a linear equalizer of an RF transceiver of claim 13 wherein the specified roll-off factor is equal to 0.4.

15. The method for optimizing a linear equalizer of an RF transceiver of claim 12 wherein a sampling rate of the equalizer is chosen to match a sample rate of one of a receive path analog-to-digital converter or a transmit path digital-to-analog converter.

16. The method for optimizing a linear equalizer of an RF transceiver of claim 12 wherein determining a digital filter includes decimation filtering and channel select filtering within a receiver and interpolation filtering for a transmitter.

* * * * *